US008510108B2

(12) United States Patent
Sekiya et al.

(10) Patent No.: US 8,510,108 B2
(45) Date of Patent: Aug. 13, 2013

(54) VOICE PROCESSING DEVICE FOR MAINTAINING SOUND QUALITY WHILE SUPPRESSING NOISE

(75) Inventors: Toshiyuki Sekiya, Tokyo (JP); Mototsugu Abe, Kanagawa (JP)

(73) Assignee: Sony Corporation, Tokyo (JP)

( * ) Notice: Subject to any disclaimer, the term of this patent is extended or adjusted under 35 U.S.C. 154(b) by 148 days.

(21) Appl. No.: 13/041,705

(22) Filed: Mar. 7, 2011

(65) Prior Publication Data

US 2011/0231187 A1 Sep. 22, 2011

(30) Foreign Application Priority Data

Mar. 16, 2010 (JP) ............................... P2010-059622

(51) Int. Cl.
*G10L 15/20* (2006.01)

(52) U.S. Cl.
USPC ........................................... 704/233; 704/226

(58) Field of Classification Search
USPC .................................................. 704/226, 233
See application file for complete search history.

(56) References Cited

U.S. PATENT DOCUMENTS 6,393,396 B1 * 5/2002 Nakagawa et al. ........... 704/233
7,054,808 B2 * 5/2006 Yoshida ........................ 704/226
7,099,821 B2 * 8/2006 Visser et al. .................. 704/226
7,426,464 B2 * 9/2008 Hui et al. ...................... 704/227
7,613,310 B2 * 11/2009 Mao ............................. 381/94.7
8,195,246 B2 * 6/2012 Vitte et al. .................... 455/570
2009/0271187 A1 * 10/2009 Yen et al. ...................... 704/226

FOREIGN PATENT DOCUMENTS

JP 3484112 10/2003
JP 4247037 1/2009

* cited by examiner

*Primary Examiner* — Douglas Godbold
*Assistant Examiner* — Ernest Estes
(74) *Attorney, Agent, or Firm* — Finnegan, Henderson, Farabow, Garrett & Dunner, L.L.P.

(57) ABSTRACT

A voice processing device includes a zone detection unit which detects a voice zone including a voice signal or a non-steady sound zone including a non-steady signal other than the voice signal from an input signal and a filter calculation unit that calculates a filter coefficient for maintaining the quality of the voice signal in the voice zone while suppressing the non-steady signal in the non-steady sound zone according to the detection result by the zone detection unit, in which the filter calculation unit calculates the filter coefficient by using a filter coefficient calculated in the non-steady sound zone for the voice zone and using a filter coefficient calculated in the voice zone for the non-steady sound zone. In one embodiment, a verification unit verifies a constraint condition of the filter coefficient based on whether the amount of suppression of the non-steady sound signal that would result from applying the filter to the sound signal is less than or equal to a threshold value.

9 Claims, 25 Drawing Sheets

VOICE PROCESSING DEVICE FOR MAINTAINING SOUND QUALITY WHILE SUPPRESSING NOISE

BACKGROUND OF THE INVENTION

1. Field of the Invention

The present invention relates to a voice processing device, a voice processing method and a program.

2. Description of the Related Art

There is known a technology that suppresses noises in input voice which includes the noises from the past (for example, Japanese Patent Nos. 3484112 and 4247037). According to Japanese Patent No. 3484112, the directivity of a signal obtained from a plurality of microphones is detected, and noises are suppressed by performing spectral subtraction according to the detected result. In addition, according to Japanese Patent No. 4247037, after multi-channels are processed, noises are suppressed by using the mutual correlation between the channels.

SUMMARY OF THE INVENTION

In Japanese Patent No. 3484112, however, since processes are performed in a frequency domain, there is a problem that, if noises such as operation sound that are concentrated for a very short period of time are dealt with, the noises are not able to be suppressed sufficiently as the disparity of the noises are expanded in the entire frequency. In addition, in Japanese Patent No. 4247037, power spectrum is modified and processes are performed in the frequency domain by using extended mutual correlation in order to suppress sporadic noises, but there is a problem that noises are not able to be suppressed sufficiently for very short signals such as operation sound alike in Japanese Patent No. 3484112.

In that sense, the invention takes the problems into consideration, and it is desirable for the invention to provide a novel and improved voice processing device, voice processing method, and program which enable the detection of a time zone where noises concentrated for a very short period time with disparity are generated, thereby suppressing the noises sufficiently.

In order to solve the problem, according to an embodiment of the present invention, there is provided a voice processing device including a zone detection unit which detects a voice zone including a voice signal or a non-steady sound zone including a non-steady signal other than the voice signal from an input signal, and a filter calculation unit that calculates a filter coefficient for holding the voice signal in the voice zone and for suppressing the non-steady signal in the non-steady sound zone according to the detection result by the zone detection unit, in which the filter calculation unit calculates the filter coefficient by using a filter coefficient calculated in the non-steady sound zone for the voice zone and using a filter coefficient calculated in the voice zone for the non-steady sound zone.

Furthermore, the voice processing device further includes a recording unit which records information of the filter coefficient calculated in the filter calculation unit in a storing unit for each zone, and the filter calculation unit may calculate the filter coefficient by using information of the filter coefficient of the non-steady sound zone recorded in the voice zone and information of the filter coefficient of the voice zone recorded in the non-steady sound zone.

The filter calculation unit may calculate a filter coefficient for outputting a signal that makes the input signal be held in the voice zone and calculates a filter coefficient for outputting a signal that makes the input signal zero in the non-steady sound zone.

Furthermore, according to the embodiment, the voice processing device includes a feature amount calculation unit which calculates the feature amount of the voice signal in the voice zone and the feature amount of the non-steady sound signal in the non-steady sound zone, and the filter calculation unit may calculate the filter coefficient by using the feature amount of the non-steady signal in the voice zone and using the feature amount of the voice signal in the non-steady sound zone.

Furthermore, the zone detection unit may detect a steady sound zone that includes the voice signal or a steady signal other than the non-steady signal, and the filter calculation unit may calculate a filter coefficient for suppressing the steady sound signal in the steady sound zone.

Furthermore, the feature amount calculation unit may calculate the feature amount of the steady sound signal in the steady sound zone.

Furthermore, the filter calculation unit may calculate the filter coefficient by using the feature amount of the non-steady sound signal and the feature amount of the steady sound signal in the voice zone, using the feature amount of the voice signal in the non-steady sound zone, and using the feature amount of the voice signal in the steady sound zone.

Furthermore, according to the embodiment, the voice processing device includes a verification unit which verifies a constraint condition of the filter coefficient calculated by the filter calculation unit, and the verification unit may verify a constraint condition of the filter coefficient based on the feature amount in each zone calculated by the feature amount calculation unit.

Furthermore, the verification unit may verify a constraint condition of the filter coefficient in the voice zone based on the determination whether or not the suppression amount of the non-steady sound signal in the non-steady sound zone and the suppression amount of the steady sound signal in the steady sound zone is equal to or smaller than a predetermined threshold value.

Furthermore, the verification unit may verify a constraint condition of the filter coefficient in the non-steady sound zone based on the determination whether or not the deterioration amount of the voice signal in the voice zone is equal to or greater than a predetermined threshold value.

Furthermore, the verification unit may verify a constraint condition of the filter coefficient in the steady sound zone based on the determination whether or not the deterioration amount of the voice signal in the voice zone is equal to or greater than a predetermined threshold value.

Furthermore, in order to solve the above problem, according to another embodiment of the present invention, there is provided a voice processing method including the steps of detecting a voice zone including a voice signal or a non-steady sound zone including a non-steady signal other than the voice signal from an input signal, and holding the voice signal by using a filter coefficient calculated in the non-steady sound zone for the voice zone and suppressing the non-steady signal by using a filter coefficient calculated in the voice zone for the non-steady sound zone according to the result of the detection.

Furthermore, in order to solve the above problem, there is provided a program causing a computer to function as a voice processing device including a zone detection unit which detects a voice zone including a voice signal or a non-steady sound zone including a non-steady signal other than the voice signal from an input signal, and a filter calculation unit which calculates a filter coefficient for holding the voice signal in the voice zone and for suppressing the non-steady signal in the non-steady sound zone as a result of detection by the zone detection unit, and the filter calculation unit calculates the filter coefficient by using a filter coefficient calculated in the non-steady sound zone for the voice zone and using a filter coefficient calculated in the voice zone for the non-steady sound zone.

DESCRIPTION OF THE PREFERRED EMBODIMENTS

Figure 1:
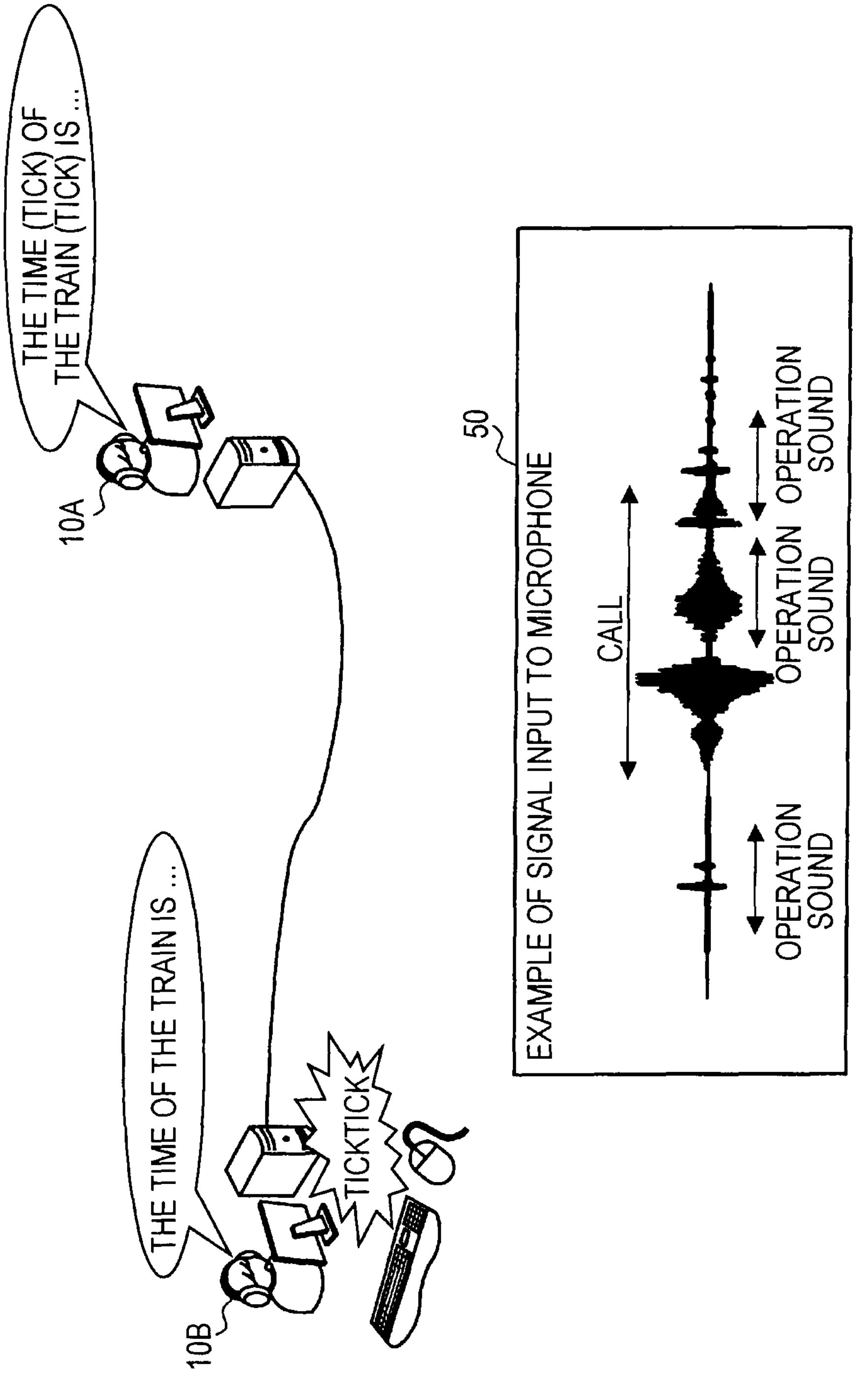
FIG. 1 is an illustrative diagram showing the overview according to a first embodiment of the present invention.

Hereinbelow, exemplary embodiments of the present invention will be described in detail with reference to accompanying drawings. In the present specification and drawings, the same reference numerals will be given to constituent elements practically having the same functional composition and overlapping descriptions thereof will not be repeated.

Furthermore, "Preferred Embodiments" will be described according to the following order.

1. The Objective of Embodiments
2. First Embodiment
3. Second Embodiment
4. Third Embodiment
5. Fourth Embodiment
6. Fifth Embodiment
7. Sixth Embodiment

1. The Objective of Embodiments

First, the objective of embodiments will be described.

From the past, the technology for suppressing noises in input voice to which the noises are input has been disclosed (for example, Japanese Patent Nos. 3484112 and 4247037). According to Japanese Patent No. 3484112, the directivity of a signal obtained from a plurality of microphones is detected, and noises are suppressed by performing spectral subtraction according to the detected result. In addition, according to Japanese Patent No. 4247037, after multi-channels are processed, noises are suppressed by using the mutual correlation between the channels.

In Japanese Patent No. 3484112, however, since processes are performed in a frequency domain, there is a problem that, if noises such as operation sound that are concentrated for a very short period of time are dealt with, the noises are not able to be suppressed sufficiently as the disparity of the noises are expanded in the entire frequency. In addition, in Japanese Patent No. 4247037, power spectrum is modified and processes are performed in the frequency domain by using extended mutual correlation in order to suppress sporadic noises, but there is a problem that noises are not able to be suppressed sufficiently for very short signals such as operation sound alike in Japanese Patent No. 3484112.

Hence, it is considered that noises are suppressed with a time domain process by using a plurality of microphones. For example, a microphone for picking up only noises (noise microphone) is provided at a different location from that of a microphone for picking up voices (main microphone). In this case, noises can be removed by subtracting a signal of the noise microphone from a signal of the main microphone. However, since the locations of the microphones are different, the noise signal contained in the main microphone and the noise signal contained in the noise microphone are not equivalent. Therefore, learning is performed when voices are not present, and the two noise signals are made to correspond to each other.

In the technology described above, it is necessary to separate both microphones sufficiently far from each other so that voices are not input to the noise microphone, but in this case, learning for making the noise signals correspond to each other is not easy, and thereby worsening the performance of noise suppression. In addition, if both of the microphones get closer to each other, voices are included in the noise microphone, and thereby a voice component deteriorates by subtraction of the signal of the noise microphone from the signal of the main microphone.

Methods for suppressing noises in a state where voices and noises are obtained from all the microphones are exemplified as below.

(1) Adaptive Microphone-Array System for Noise Reduction (AMNOR), Yutaka Kaneda et al., IEEE Transactions on Acoustics, Speech, and Signal Processing, Vol. ASSP-34, No. 6, December 1986

(2) An Alternative Approach to Linearly Constrained Adaptive Beamforming, Lloyd J. Griffiths et al., IEEE Transaction on Antennas and Propagation, Vol. AP-30, No. 1, January 1982

Description will be provided by exemplifying the AMNOR method provided in No. (1) above. In the AMNOR method, learning of the filter coefficient H is performed in a zone without a target sound. At this moment, the learning is performed so that the deterioration of a voice component is eased within a certain level. When the AMNOR method is applied to the suppression of an operation sound, two points are found as below.

(1) When a noise present in a long period of time comes from a fixed direction, the AMNOR method is remarkably effective. However, learning of a filter is not performed sufficiently because an operation sound is a non-steady sound present only in a short period of time and sounds of a mouse and a keyboard come from different directions depending on their respective different locations.

(2) For the purpose of controlling the deterioration of a target sound, the AMNOR method is very effective in noise suppression in the case where noises are included at all times, but the operation sound overlaps a voice unsteadily, so the method may deteriorate the quality of a target voice further.

Therefore, attention is paid to the circumstances as above, and a voice processing device according to an embodiment of the present invention has been created. In the voice processing device according to the embodiment, a time zone where noises are concentrated for a very short period of time with disparity is detected, and thereby the noises are suppressed sufficiently. To be more specific, a process is performed in a time domain in order to suppress noises (hereinafter, which may be described by being referred to as an operation sound) concentrated for a very short period of time unsteadily with disparity. In addition, a plurality of microphones is used for operation sounds occurring at a variety of locations, and suppression is performed by using the directions of sounds. Furthermore, in order to respond to operation sounds in diversified input devices, suppression filters are adaptively acquired according to input signals. Moreover, learning of filters is performed for improving sound quality also in a zone with voices.

2. First Embodiment

Next, a first embodiment will be described. First of all, the overview of the first embodiment will be described with reference to FIG. 1. The embodiment aims to suppress non-steady noises that are incorporated into transmitted voices, for example, during voice chatting. As shown in FIG. 1, a user 10A and a user 10B are assumed to conduct voice chatting using PC or the like respectively. At this time, when the user 10B transmits the voice, an operation sound of "tick tick" occurring from the operation of a mouse, a keyboard, or the like is input together with the voice saying "the time of the train is . . . ."

The operation sound does not overlap the voice at all times as shown by the reference numeral 50 of FIG. 1. In addition, as the location of the keyboard, the mouse, or the like that causes the operation sound is changed, the occurrence location of a noise is changed. Furthermore, since operation sounds from a keyboard, a mouse and the like are different depending on the kind of equipment, various operation sounds exist.

Therefore, in the embodiment, the zone of a voice and the zone of an operation sound which is non-steady sound of a mouse, a keyboard, or the like are detected from among input signals, and noises are suppressed efficiently by adopting an optimal process in each zone. Furthermore, processes are not shifted discontinuously depending on the detected zone, but the processes are shifted consecutively to reduce discomforts when a voice is started. Moreover, the control of final sound quality is possible by performing a process in each zone and then using the deterioration amount of voice and noise suppression.

Figure 2:
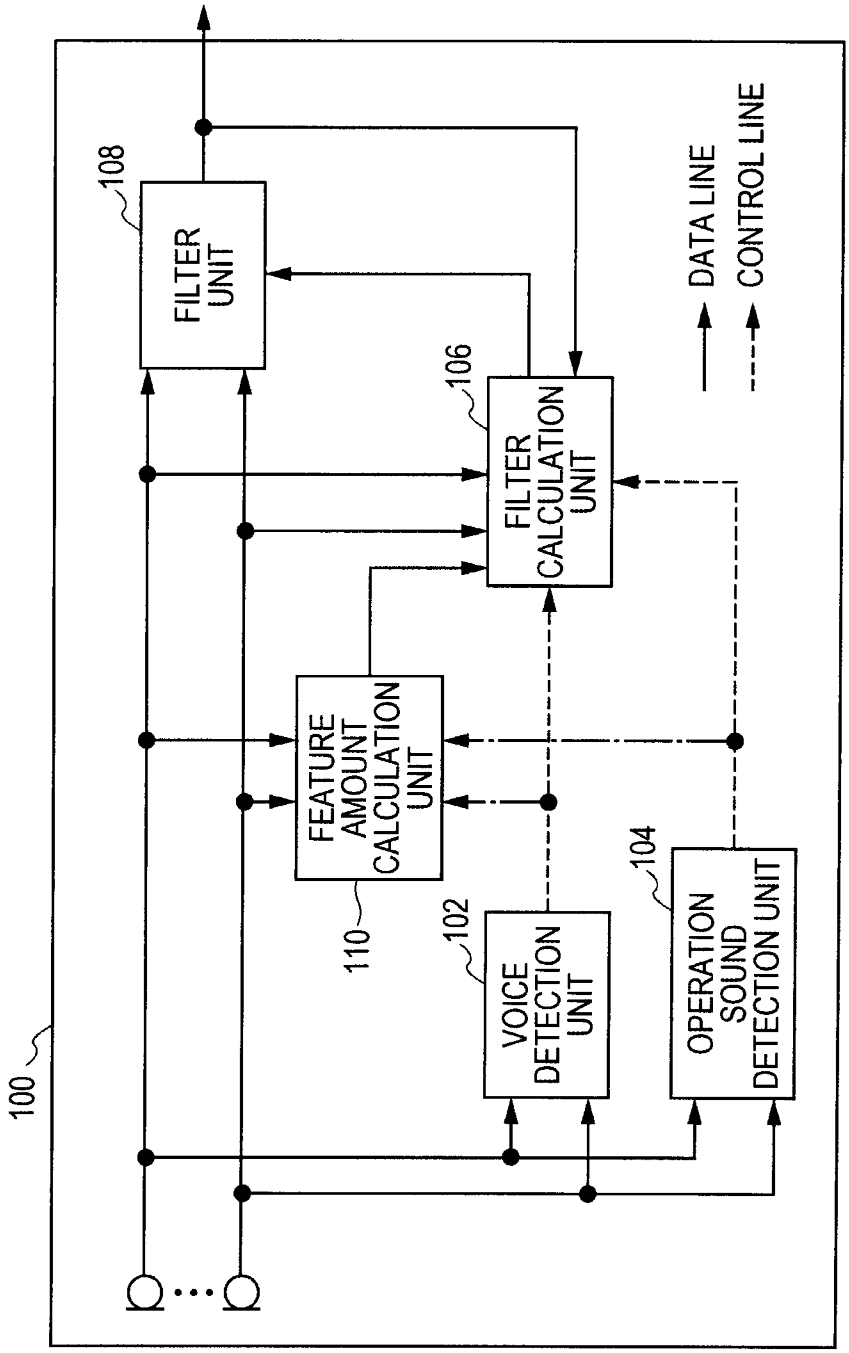
FIG. 2 is a block diagram showing the functional composition of a voice processing device according to the embodiment.

Hereinabove, the overview of the embodiment has been described. Next, the functional composition of a voice processing device 100 will be described with reference to FIG. 2. FIG. 2 is a block diagram showing the functional composition of the voice processing device 100. As shown in FIG. 2, the voice processing device 100 is provided with a voice detection unit 102, an operation sound detection unit 104, a filter calculation unit 106, a filter unit 108, and the like.

Figure 3:
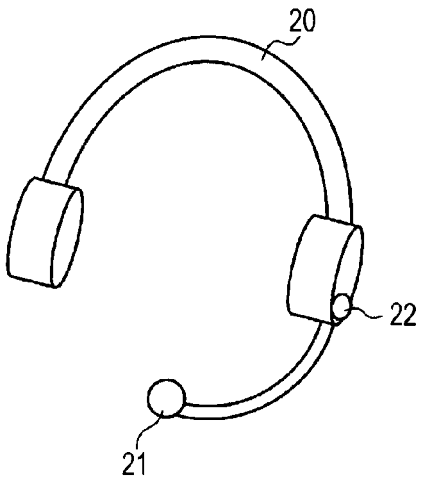
FIG. 3 is an illustrative diagram showing the appearance of a head set according to the embodiment.

The voice detection unit 102 and the operation sound detection unit 104 are an example of a zone detection unit of the invention. The voice detection unit 102 has a function of detecting a voice zone containing voice signals from input signals. For the input signals, two microphones are used in a head set 20, and a microphone 21 is provided in the mouth portion and a microphone 22 in an ear portion of the head set, as shown in FIG. 3.

Figure 4:
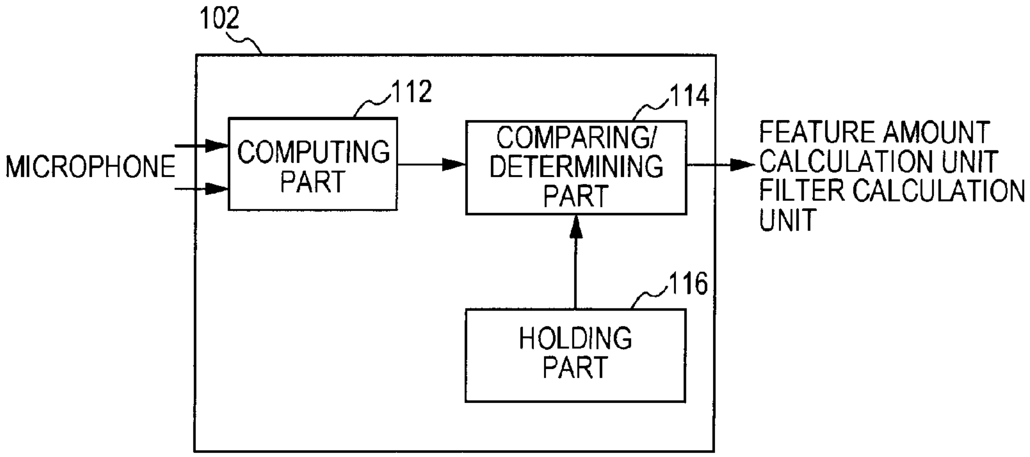
FIG. 4 is a block diagram showing the functional composition of a voice detection unit according to the embodiment.

Herein, the function of voice detection by the voice detection unit 102 will be described with reference to FIG. 4. As shown in FIG. 4, the voice detection unit 102 includes a computing part 112, a comparing/determining part 114, a holding part 116, and the like. The computing part 112 calculates input energies input from the two microphones, and calculates the difference between the input energies. The comparing/determining part 114 compares the calculated difference between the input energies to a predetermined threshold, and determines whether or not there is a voice according to the comparison result. Then, the comparing/determining part 114 provides a feature amount calculation unit 110 and a filter calculation unit 106 with a control signal for the existence/non-existence of a voice.

Figure 5:
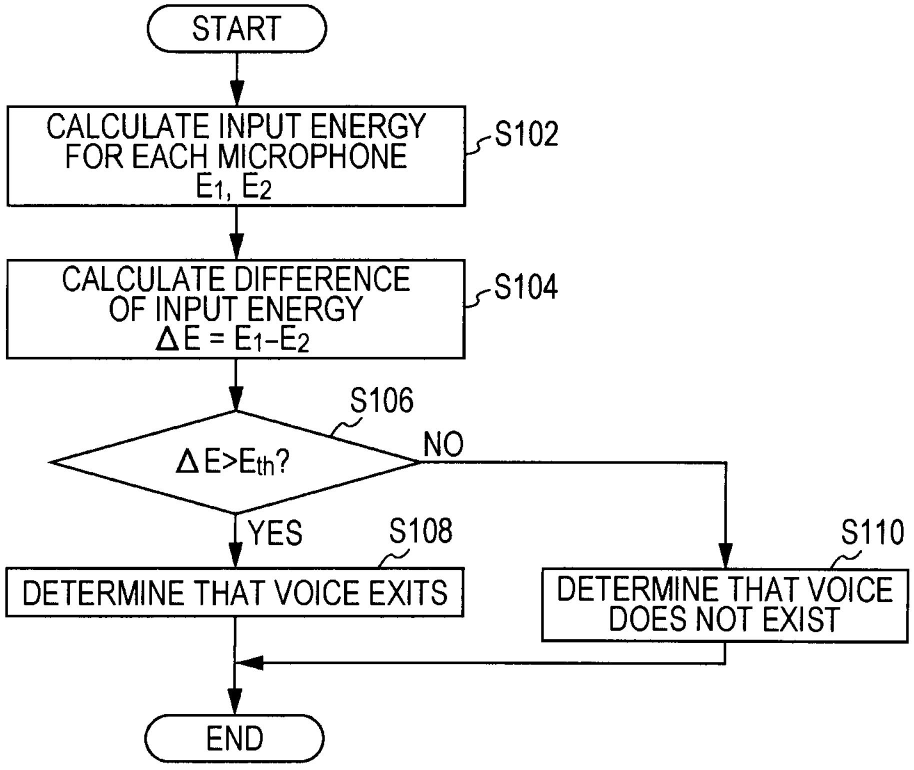
FIG. 5 is a flowchart showing a voice detection process according to the embodiment.

Next, a voice detection process by the voice detection unit 102 will be described with reference to FIG. 5. FIG. 5 is a flowchart showing the voice detection process by the voice detection unit 102. As shown in FIG. 5, first, input energies of each microphone ($E_1$ and $E_2$) are calculated for the two microphones provided in the head set (S102). The input energies are calculated by the mathematical expression given below. $x_i(t)$ indicates a signal observed in a microphone i during a time t. In other words, Expression 1 indicates the energy of a signal in zones $L_1$ and $L_2$.

$$E_i = \frac{1}{L_2 - L_1} \sum_{t=L_1}^{L_2} x_i(t)^2 \quad \text{[Expression 1]}$$

Then, the difference $\Delta E = E_1 - E_2$ of the input energies calculated in Step S102 is calculated (S104). Then, a threshold value $E_{th}$ and the difference $\Delta E$ of the input energies calculated in Step S104 are compared (S106).

When the difference $\Delta E$ is determined to be greater than the threshold value Eth in Step S106, a voice is determined to exist (S108). When the difference $\Delta E$ is determined to be smaller than the threshold value $E_{th}$ in Step S106, a voice is determined not to exist (S110).

Figure 6:
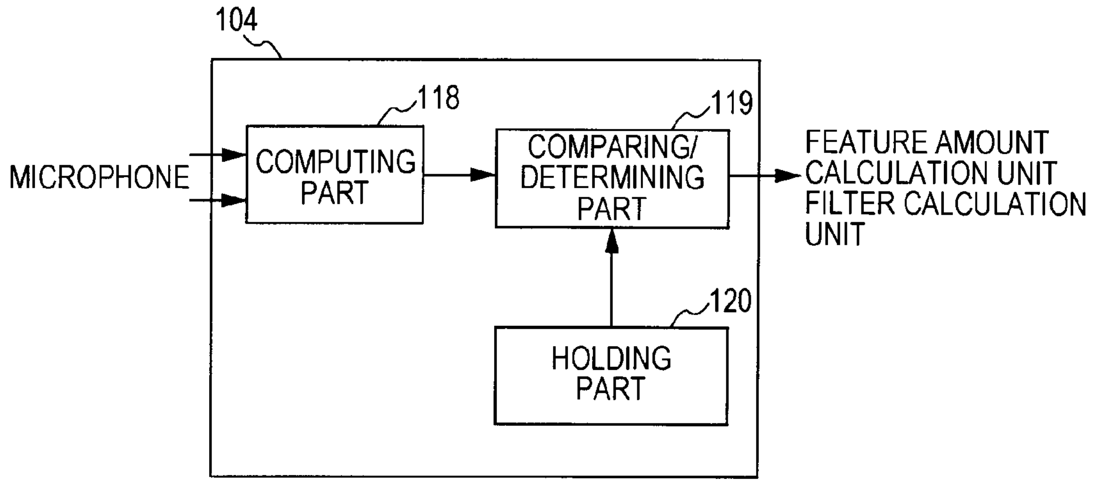
FIG. 6 is a block diagram showing the functional composition of an operation sound detection unit according to the embodiment.
Figure 7:
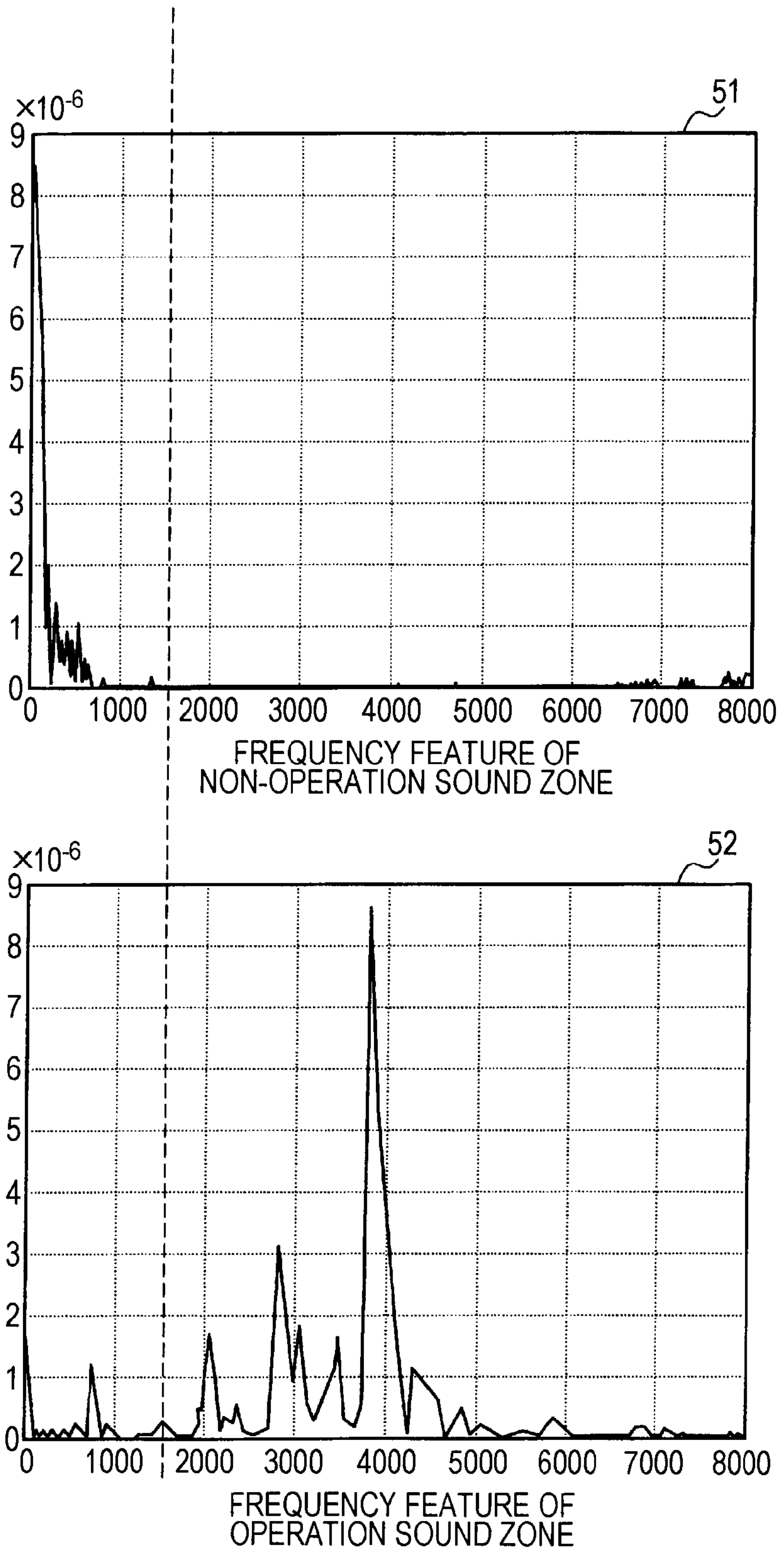
FIG. 7 is an illustrative diagram showing a frequency property in an operation sound zone according to the embodiment.

Next, the function of detecting an operation sound by the operation sound detection unit 104 will be described with reference to FIG. 6. As shown in FIG. 6, the operation sound detection unit 104 includes a computing part 118, a comparing/determining part 119, a holding part 120, and the like. The computing part 118 applies a high-pass filter to the signal $x_1$ from the microphone 21 in the mouth portion, and calculates the energy $E_1$. As shown in FIG. 7, since the operation sound includes high frequencies, the feature is used, and only signals from one microphone are sufficient for being used in the detection of the operation sound.

The comparing/determining part 119 compares the threshold value $E_{th}$ to the energy $E_1$ calculated by the computing part 118, and determines whether or not the operation sound exists according to the comparison result. Then, the comparing/determining part 119 provides the feature amount calculation unit 110 and the filter calculation unit 106 with a control signal for the existence/non-existence of the operation sound.

Figure 8:
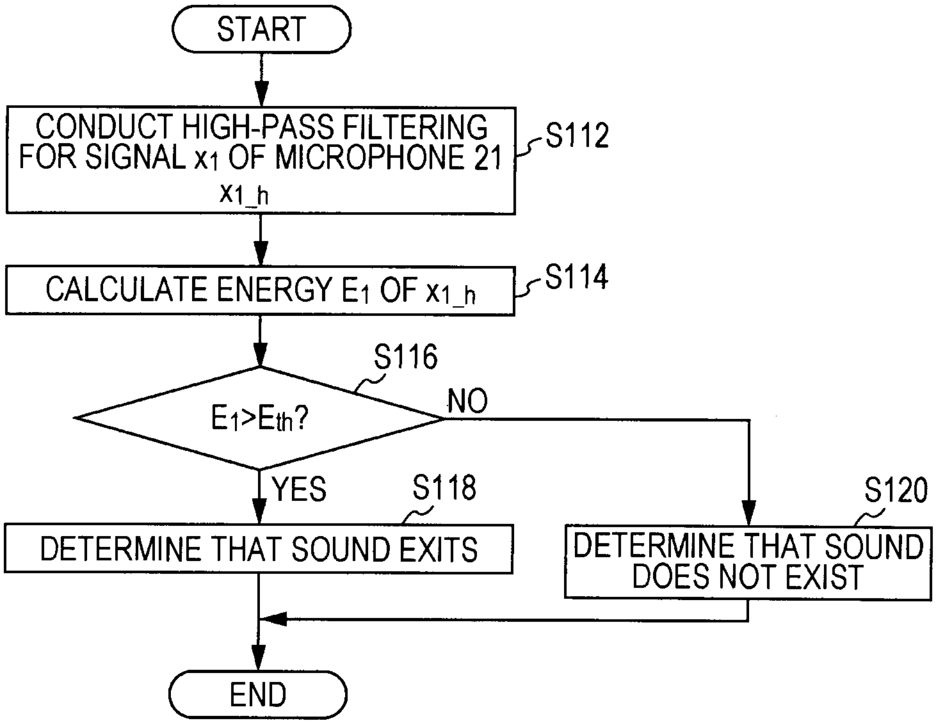
FIG. 8 is a flowchart showing an operation sound detection process according to the embodiment.

Next, an operation sound detection process by the operation sound detection unit 104 will be described with reference to FIG. 8. FIG. 8 is a flowchart showing the operation sound detection process by the operation sound detection unit 104. As shown in FIG. 8, first, the high-pass filter is applied to the signal $x_1$ from the microphone 21 in the mouth portion of the head set (S112). In Step S112, $x_{1\_}h$ is calculated by the mathematical expression given below.

$$x_{1\_h}(t) = \sum_{i=0}^{L} H(i) \cdot x_1(t-i) \quad \text{[Expression 2]}$$

Then, the energy E1 of $X_{1\_}h$ is calculated by the mathematical expression given below (S114).

$$E_1 = \frac{1}{L_2 - L_1} \sum_{t=L_1}^{L_2} x_{1\_h}(t)^2 \quad \text{[Expression 3]}$$

Then, it is determined whether or not the energy $E_1$ calculated in Step S114 is greater than the threshold value $E_{th}$ (S116). In Step S116, when the energy $E_1$ is determined to be greater than the threshold value $E_{th}$, the operation sound is determined to exist (S118). When the energy $E_1$ is determined to be smaller than the threshold value $E_{th}$ in Step S116, the operation sound is determined not to exist (S118).

In the above description, the operation sound is detected by using the fixed high-pass filter H. However, the operation sound includes various sounds from a keyboard, a mouse, and the like, that is, various frequencies. Hence, it is desirable that the high-pass filter H is constituted dynamically according to input data. Hereinbelow, the operation sound is detected by using an autoregressive model (AR model).

In the AR model, the current input is expressed by using an input sample of the past of the device itself as shown in the mathematical expression below.

$$x(t) = \sum_{i=1}^{p} a_i \cdot x(t-i) + e(t) \quad \text{[Expression 4]}$$

In this case, if the input is steady in terms of time, the value of $a_i$ seldom changes. The value of e(t) gets smaller. On the other hand, when the operation sound is included, a totally different signal from before is input, so the value of e(t) gets extremely greater. With the use of this feature, the operation sound can be detected. As such, with the use of the device's own input, any kind of operation sound can be detected in terms of non-steadiness.

Figure 9:
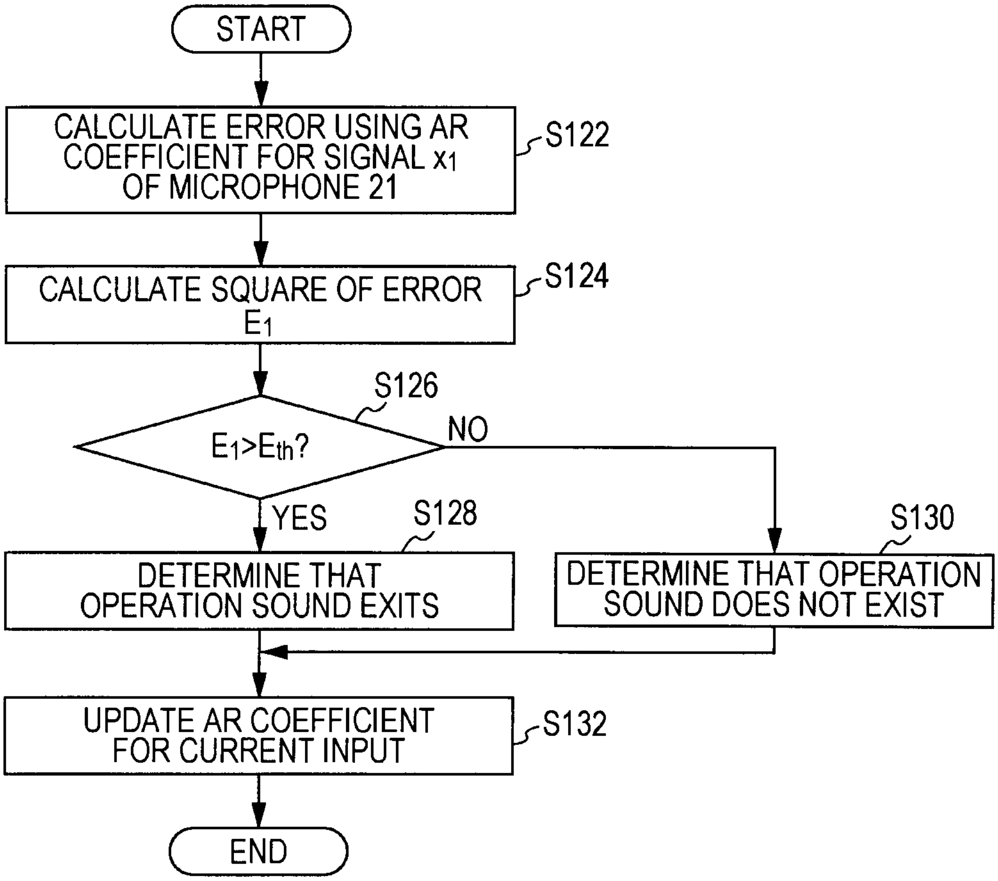
FIG. 9 is a flowchart showing an operation sound detection process according to the embodiment.

With reference to FIG. 9, a process of detecting an operation sound using the AR model will be described. FIG. 9 is a flowchart showing an operation sound detection process using the AR model. As shown in FIG. 9, an error is calculated for the signal $x_1$ of the microphone 21 in the mouth portion of the head set based on the mathematical expression given below using an AR coefficient (S122).

$$e(t) = x_1(t) - \sum_{i=1}^{p} a_i \cdot x_1(t-i) \quad \text{[Expression 5]}$$

Then, the square of the error $E_1$ is calculated based on the mathematical expression given below (S124).

$$E_1 = \frac{1}{L_2 - L_1} \sum_{t=L_1}^{L_2} e(t)^2 \quad \text{[Expression 6]}$$

Then, it is determined whether or not $E_1$ is greater than the threshold value $E_{th}$ (S126). In Step S126, when $E_1$ is determined to be greater than the threshold value $E_{th}$, the operation sound is determined to exist (S128). When $E_1$ is determined to be smaller than the threshold value $E_{th}$ in Step S126, the operation sound is determined not to exist (S130). Then, the AR coefficient is updated for the current input based on the mathematical expression given below (S132). a(t) indicates an AR coefficient in a time t. μ is a positive constant having a small value. For example, μ=0.01 or the like can be used.

$$a(t+1) = a(t) + \mu \cdot e(t) \cdot X(t)$$

$$a(t) = (a_1(t), \ldots, a_p(t))^T$$

$$X(t) = (x_1(t-1), x_1(t-2), \ldots, x_1(t-p))^T \quad \text{[Expression 7]}$$

Returning to FIG. 2, the description on the functional composition of the voice processing device 100 will be continued. As a result of the detection by the voice detection unit 102 and the operation sound detection unit 104, the filter calculation unit 106 has functions of holding a voice signal in the voice zone and calculating a filter coefficient that suppresses an unsteady signal in a non-steady sound zone (operation sound zone). In addition, the filter calculation unit 106 uses a filter coefficient calculated in the non-steady sound zone for the voice zone, and a filter coefficient calculated in the voice zone for the non-steady sound zone. Accordingly, discontinuity in shifting zones diminishes, and learning of a filter is performed only in a zone where the operation sound exists, thereby suppressing the operation sound efficiently.

Figure 10:
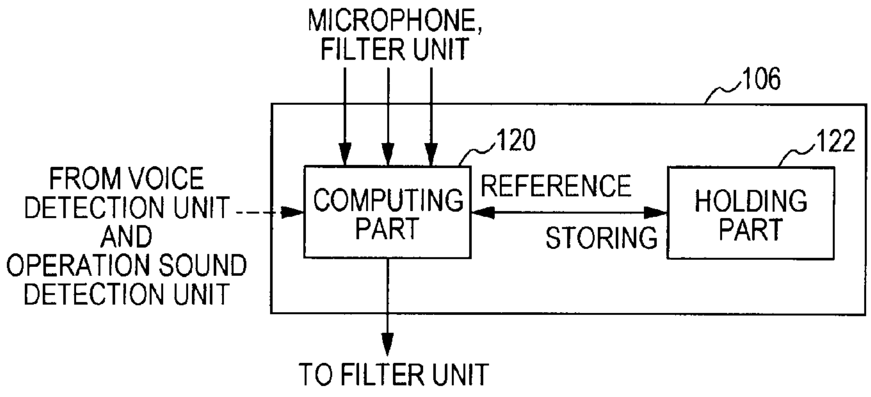
FIG. 10 is a block diagram showing the functional composition of a filter calculation unit according to the embodiment.

Herein, the function of the filter calculation unit 106 that calculates a filter coefficient will be described with reference to FIG. 10. As shown in FIG. 10, the filter calculation unit 106 includes a computing part 120, a holding part 122, and the like. The computing part 120 updates a filter by referring to a filter coefficient held in the holding part 122 and to the current input signal and zone information (control signal) input from the voice detection unit 102 and the operation sound detection unit 104. The filter held in the holding part 122 is overwritten with the updated filter. The holding part 122 holds a filter of updating before this round. The holding part 122 is an example of a recording unit of the present invention.

Figure 11:
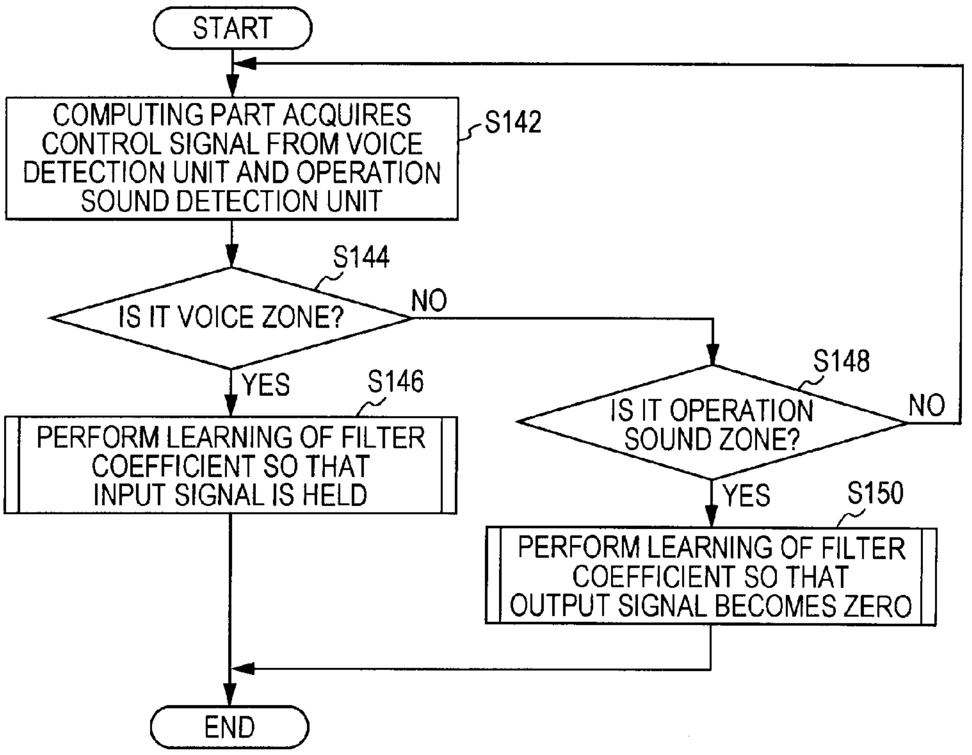
FIG. 11 is a flowchart showing a calculation process of a filter coefficient according to the embodiment.

A process of calculating a filter coefficient by the filter calculation unit 106 will be described with reference to FIG. 11. FIG. 11 is a flowchart showing the calculation process of a filter coefficient by the filter calculation unit 106. As shown in FIG. 11, first, the computing part 120 acquires control signals from the voice detection unit 102 and the operation sound detection unit 104 (S142). The control signals acquired in Step S142 are control signals that are related to the zone information and distinguish whether the input signal is in a voice zone or an operation sound zone.

Then, it is determined whether or not the input signal is in the voice zone (S144) based on the control signals acquired in Step S142. When it is determined that the input signal is in the voice zone in S144, leaning of a filter coefficient is performed so as to hold the input signal (S146).

In addition, when it is determined that the input signal is not in the voice zone in Step S144, determination is performed whether or not it is in the operation sound zone (S148). When it is determined that the input signal is in the operation sound zone in Step S148, learning of a filter coefficient is performed so that an output signal is zero (S150).

Herein, an example of the learning rule of a filter coefficient in the voice zone and the operation sound zone will be described. Since the input signal is intended to be retained in the voice zone as possible as it can be, learning is performed so that the output of the filter unit 108 approximates to the input signal of the microphones. A mathematical expression is defined as below herein. ϕx_i(t) is a value input to a microphone i from a time t to t−p+1 arrayed in a line. ϕ(t) is the 2p number of vectors of which ϕx_i(t) is arrayed in a line for each microphone. Hereinafter, ϕ(t) is referred to as an input vector.

$$\phi(t)=[\phi_{x_1}(t),\phi_{x_2}(t)]^T$$

$$\phi_{x_1}(t)=(x_1(t),x_1(t-1), \ldots ,x_1(t-p+1))$$

$$\phi_{x_2}(t)=(x_2(t),x_2(t-1), \ldots ,x_2(t-p+1))$$

Wherein, w indicates a filter coefficient.

$$w=(w(1),w(p), \ldots ,w(2p))^T$$

$[\ ]^T$ indicates transposition.

$$x_1(t-\tau)\leftarrow\phi(t)^T\cdot w \qquad \text{[Expression 8]}$$

When LMS (Least Mean Square) algorithm is used, updating is performed as below.

$$e(t)=x_1(t-\tau)-\phi(t)^T\cdot w$$

$$w=w+\mu\cdot e(t)\cdot\phi(t) \qquad \text{[Expression 9]}$$

Since the output is intended to be zero in the operation sound zone, learning is performed so that the output of the filter unit 108 is zero.

$$0\leftarrow\phi(t)^T\cdot w \qquad \text{[Expression 10]}$$

When LMS algorithm is used, updating is performed as below.

$$e(t)=0-\phi(t)^T\cdot w$$

$$w=w+\mu\cdot e(t)\cdot\phi(t) \qquad \text{[Expression 11]}$$

Description is provided as above by exemplifying LMS algorithm, but learning is not limited thereto, and learning algorithm may be anything such as learning identification method or the like.

Figure 12:
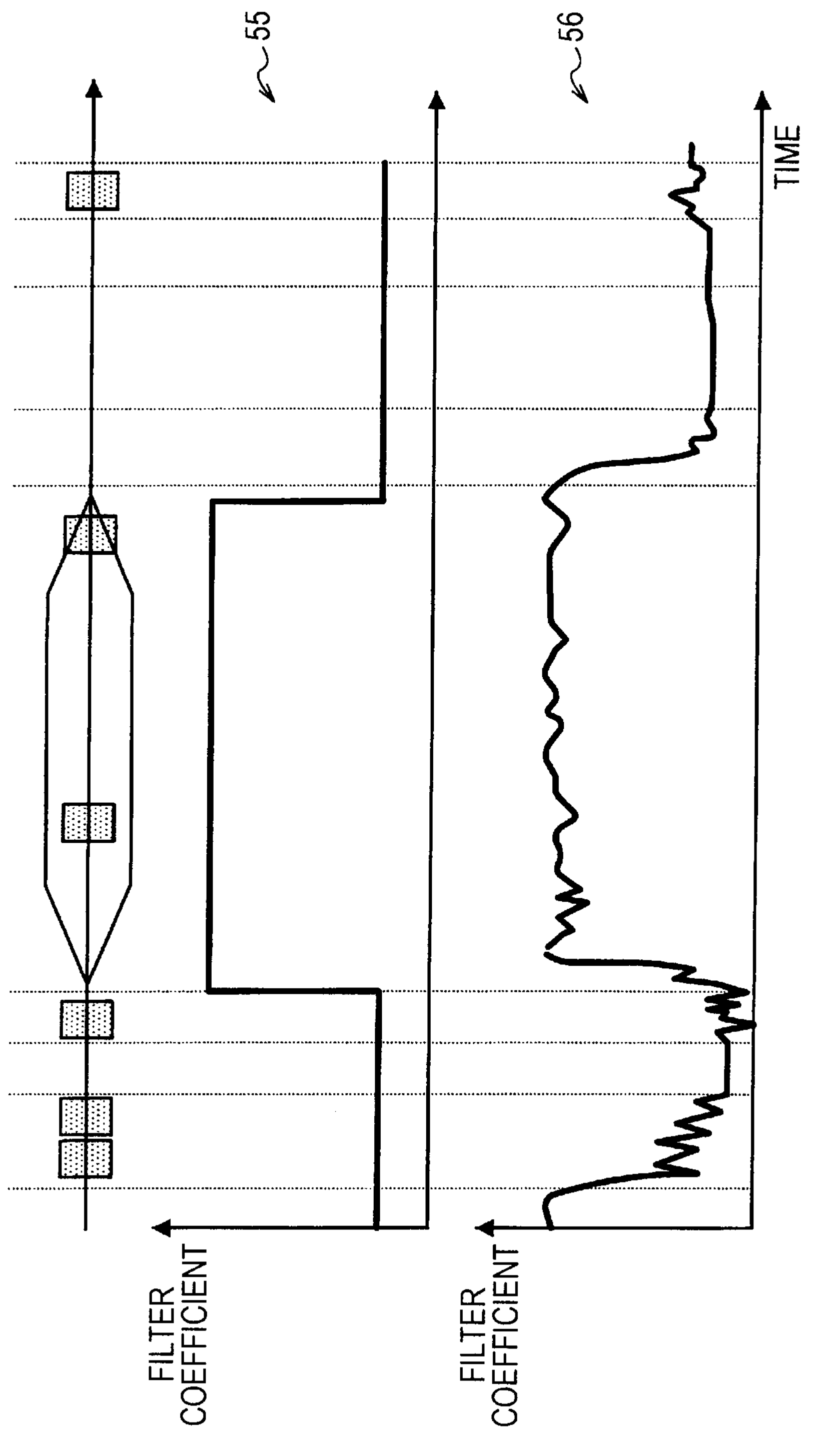
FIG. 12 is an illustrative diagram showing a voice zone and the operation sound zone according to the embodiment.

According to the learning rule described above, it is thought to be sufficient that 1 is simply applied to the voice zone and 0 to other zone than the voice zone for the input signal. As shown in FIG. 12, when 1 is applied to the voice zone and 0 to other zone than the voice zone, the image of the graph of the reference numeral 55 in the drawing is formed. In other words, the coefficient becomes 0 in a zone only for the operation sound, and 1 in the voice zone. However, since it is difficult to detect the start of the voice zone perfectly, the starting point of a voice is omitted, and a voice suddenly starts in the middle. This becomes a phenomenon that causes to feel serious discomfort acoustically. For this reason, as shown by the image of the graph of the reference numeral 56 in the drawing, discomfort of the start of a voice can be reduced while the operation sound is suppressed by changing the coefficient continuously.

Incidentally, the coefficient was intended to be zero for the operation sound zone under the previous learning condition. For this reason, right after shifting is performed to the voice zone, a voice is significantly suppressed in the same manner as the operation sound. In addition, the input signal is intended to be held in the voice zone. For this reason, the operation sound included in the input signal is gradually not able to be suppressed with the passage of time. Hereinbelow, the composition of the filter calculation unit 106 for solving the problem will be described.

Figure 13:
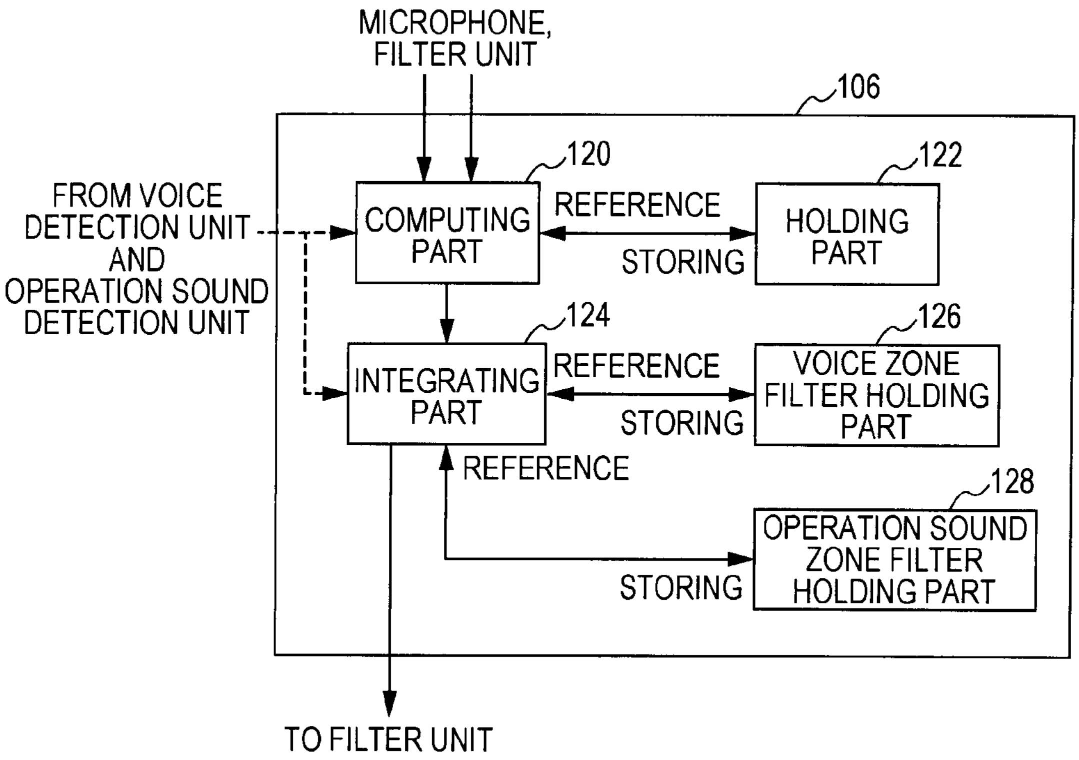
FIG. 13 is a block diagram showing the functional composition of the filter calculation unit according to the embodiment.

Herein, the function of calculating a filter coefficient by the filter calculation unit 106 for solving the problem will be described with reference to FIG. 13. FIG. 13 is a block diagram showing the functional composition of the filter calculation unit 106. As shown in FIG. 13, the filter calculation unit 106 includes an integrating part 124, a voice zone filter holding part 126, an operation sound zone filter holding part 128 and the like, in addition to the computing part 120 and the holding part 122 shown in FIG. 10.

The voice zone filter holding part 126 and the operation sound zone filter holding part 128 hold filters previously obtained in the voice zone and the operation sound zone. The integrating part 124 has a function of making a final filter by using both of the current filter coefficient and the previous filter obtained in the voice zone and the operation sound zone held in the voice zone filter holding part 126 and the operation sound zone filter holding part 128.

Figure 14:
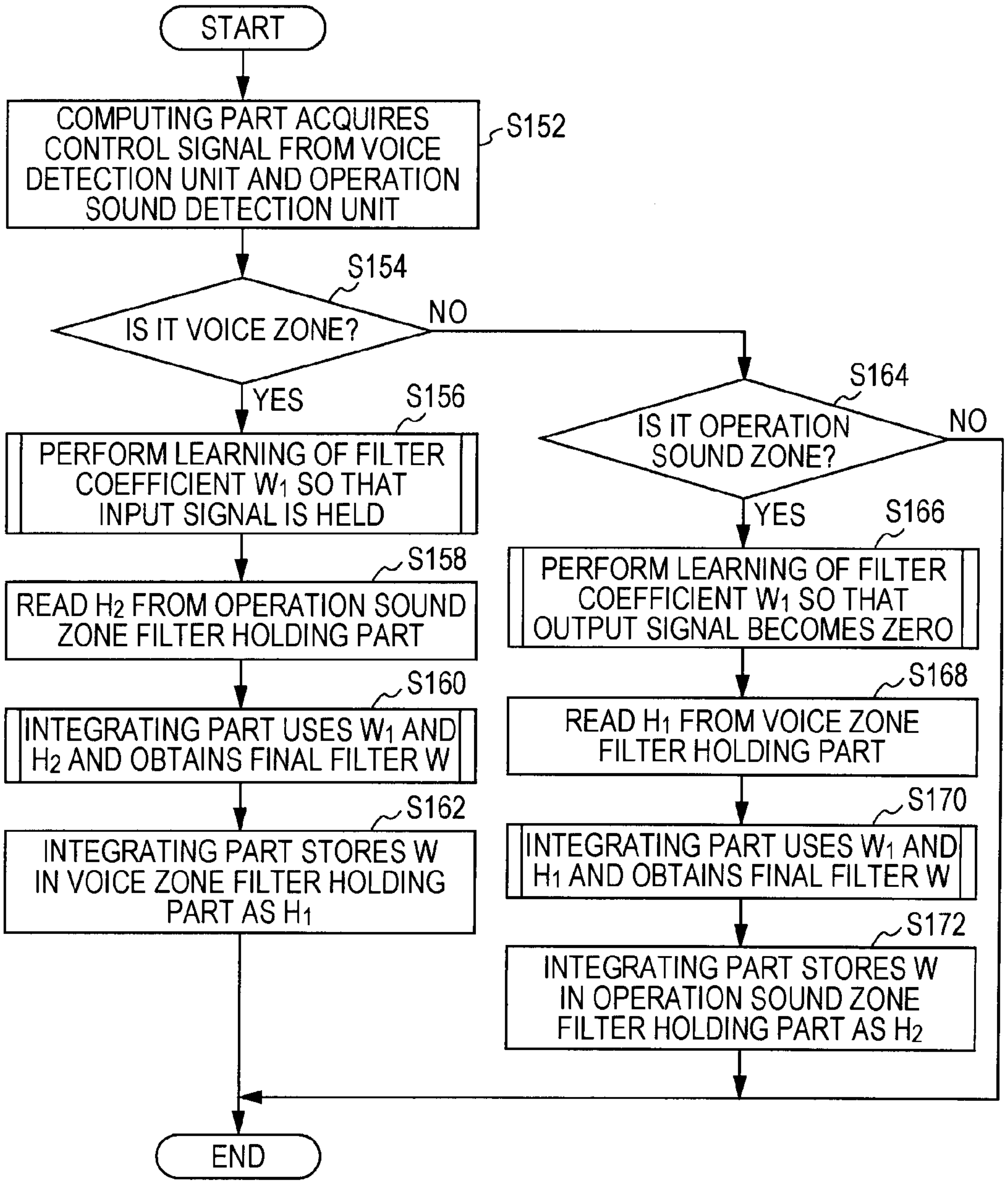
FIG. 14 is a flowchart showing a calculation process of a filter coefficient according to the embodiment.

A process of calculating a filter by the filter calculation unit 106 using the previous filter will be described with reference to FIG. 14. FIG. 14 is a flowchart showing a filter calculation process by the filter calculation unit 106. As shown in FIG. 14, first, the computing part 120 acquires a control signal from the voice detection unit 102 and the operation sound detection unit 104 (S152). It is determined whether or not the input signal is in the voice zone based on the control signal acquired in Step S152 (S154). When it is determined that the input signal is in the voice zone in Step S154, learning of the filter coefficient $W_1$ is performed so as to hold the input signal (S156).

Then, $H_2$ is read from the operation sound zone filter holding part 128 (S158). Here, $H_2$ refers to data held in the operation sound zone filter holding part 128. Then, the integrating part 124 obtains the final filter W by using $W_1$ and $H_2$ (S160). In addition, the integrating part 124 stores W as $H_1$ in the voice zone filter holding part 126 (S162).

When the signal is determined not to be in the voice zone in Step S154, it is determined whether or not the input signal is in the operation sound zone (S164). When it is determined that the input signal is in the operation sound zone in Step S164, learning of the filter coefficient $W_1$ is performed so that the output signal is zero (S166). Then, $H_1$ is read from the voice zone filter holding part 126 (S168). Here, $H_1$ refers to data held in the voice zone filter holding part 126. Then, the integrating part 124 obtains the final filter W by using $W_1$ and $H_1$ (S170). In addition, the integrating part 124 stores W as $H_2$ in the operation sound zone filter holding part 128 (S172).

Herein, description on how the final filter is calculated in the integrating part 124 will be provided. The calculation of the filter $W_1$ described above is performed by the same calculation process as the learning of the filter coefficient above. The filter W in the voice zone is obtained based on the mathematical expression given below.

$$W=\alpha\cdot W_1+(1-\alpha)\cdot H_2$$

In addition, the filter W in the operation sound zone is obtained based on the mathematical expression given below.

$$W=\beta\cdot W_1+(1-\beta)\cdot H_1$$

$$0\leqq\alpha\leqq 1,$$

$$0\leqq\beta\leqq 1, \quad \text{[Expression 13]}$$

α and β may be an equal value.

As such, since information of the operation sound zone is used also in the voice zone and information of the voice zone is used also in the operation sound zone, the filter W obtained by the integrating part 124 has a complementary feature of the voice zone and the operation sound zone.

Returning to FIG. 2, the description on the functional composition of the voice processing device 100 will be continued. The feature amount calculation unit 110 has a function of calculating the feature amount of a voice signal in the voice zone and the feature amount of a non-steady sound signal (operation sound signal) in the non-steady sound zone (operation sound zone). In addition, the filter calculation unit 106 calculates a filter coefficient by using the feature amount of the operation sound signal in the voice zone and using the feature amount of the voice signal in the operation sound zone. Thereby, the operation sound can be effectively suppressed also in the voice zone.

Figure 15:
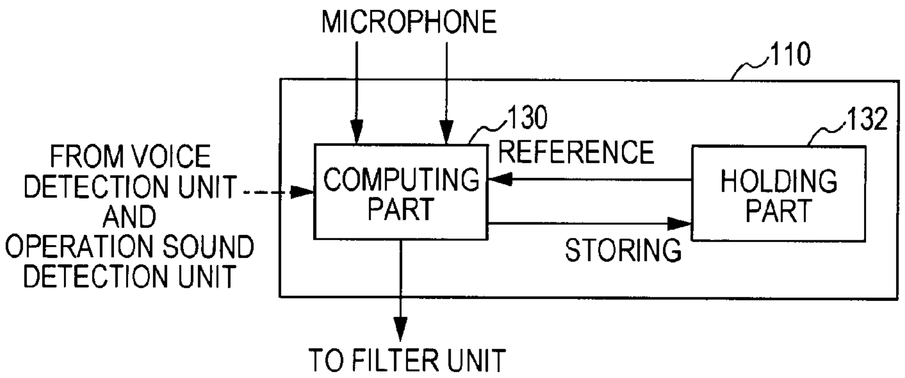
FIG. 15 is a block diagram showing the functional composition of a feature amount calculation unit according to the embodiment.

Herein, description on the function of calculating the feature amount by the feature amount calculation unit 110 will be provided with reference to FIG. 15. As shown in FIG. 15, the feature amount calculation unit 110 includes a computing part 130, a holding part 132, and the like. The computing part 130 calculates the feature of a voice and the feature of an operation sound based on the current input signal and zone information (control information), and the results are held in the holding part 132. Then, the results are smoothed as the current data with reference to the past data from the holding part 132 depending on the necessity. The holding part 132 holds the feature amounts of the past for the voice and the operation sound respectively.

Figure 16:
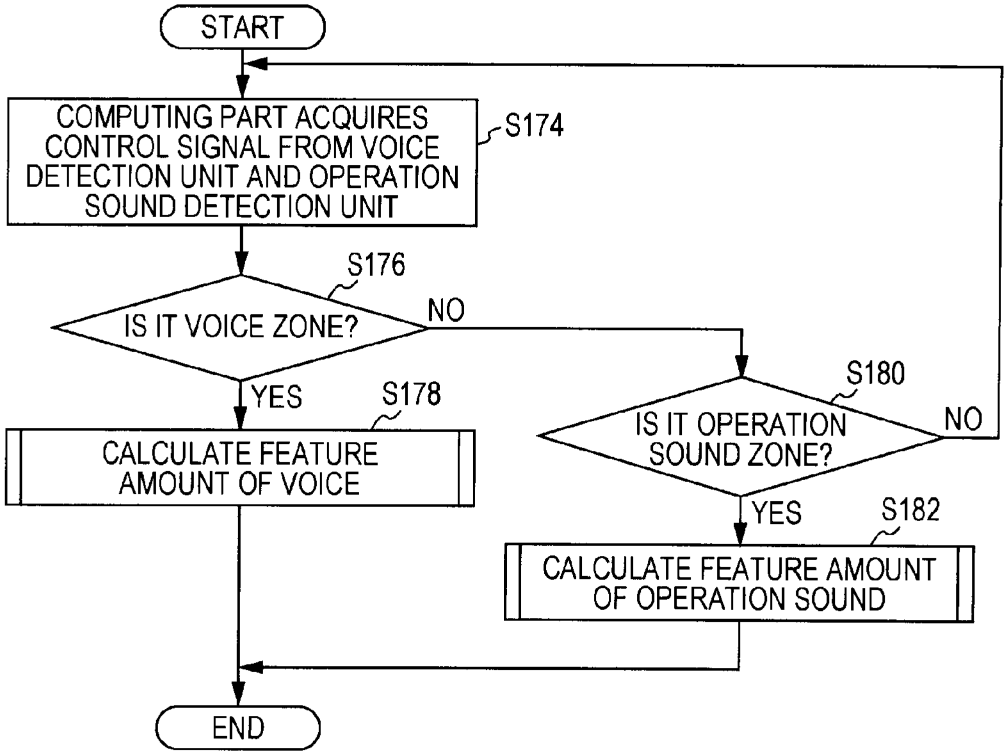
FIG. 16 is a flowchart showing a feature amount calculation process according to the embodiment.

Next, description on the process of calculating a feature amount by the feature amount calculation unit 110 will be provided with reference to FIG. 16. FIG. 16 is a flowchart showing the feature amount calculation process by the feature amount calculation unit 110. As shown in FIG. 16, the computing part 130 acquires a control signal from the voice detection unit 102 and the operation sound detection unit 104 (S174). Then, it is determined whether or not the input signal is in the voice zone based on the control signal acquired in the Step S174 (S176). When the signal is determined to be in the voice zone in the Step S176, the feature amount of a voice is calculated (S178).

On the other hand, when the signal is determined not to be in the voice zone in the Step S176, it is determined whether or not the input signal is in the operation sound zone (S180). When it is determined that the input signal is in the operation sound zone in Step S180, the feature amount of the operation sound is calculated (S182).

The following correlation matrix $R_x$ and correlation vector $V_x$ can be used based on, for example, the energy of a signal as the feature amount of a voice and the feature amount of an operation sound.

$$R_x=E[\phi(t)\cdot\phi(t)^T]$$

$$V_x=E[x_1(t-\tau)\cdot\phi(t)] \quad \text{[Expression 14]}$$

Next, description on how the energy of a signal is engaged in the correlation matrix will be provided. In addition, learning of a filter and the correlation matrix are described.

The energy can be calculated based on the following mathematical expression with regard to:

signal vector: $\phi(t)$ $$E=\frac{1}{2p}\sum_{i=0}^{2p-1}\phi(i)^2=\frac{1}{2p}(\phi(t)^T\cdot\phi(t)) \quad \text{[Expression 15]}$$

Since the energy is the sum of the square of each element, the energy becomes the inner product of the vector. Wherein, w is defined as below.

$$w\left(\frac{1}{\sqrt{2p}},\frac{1}{\sqrt{2p}},\ldots,\frac{1}{\sqrt{2p}}\right)^T \quad \text{[Expression 16]}$$

If w is defined as above, E is expressed by the following mathematical expression.

$$\begin{aligned} E&=(\phi^T(t)\cdot w)^T\cdot(\phi^T(t)\cdot w) \quad \text{[Expression 17]}\\ &=w^T\phi(t)\cdot\phi^T(t)\cdot w\\ &=w^TR_x\cdot w \end{aligned}$$

In other words, if there is a certain weight w and the correlation matrix for an input signal, the energy can be calculated. In addition, by using the above-described correlation matrix, the learning rule of the voice zone can be extended. In other words, a filter is learned so that the input signal is held as possible as it can be before the extension, but a filter can be learned so that the input signal is retained and an operation sound component is suppressed after the extension. In the embodiment, since the operation sound zone is detected, the correlation matrix $R_k$ containing only the operation sound can be calculated. Therefore, the energy $E_k$ of the operation sound component when a certain filter w is applied is as below.

$$E_k = w^T \cdot R_k \cdot w \quad \text{[Expression 18]}$$

Therefore, the extended learning rule for the voice zone can be described by the following mathematical expression. $E_k$ is a certain positive constant.

$$x_1(t-\tau) \leftarrow \phi(t)^T \cdot w \text{ subject to } E_k = w^T \cdot R_k \cdot w < \epsilon_k \quad \text{[Expression 19]}$$

In addition, the learning rule can be extended also for the operation sound zone in the same manner as for the voice zone. In other words, before the extension, a filter is learned so that the output signal approximates to zero, but after the extension, a filter is learned so that a voice component is retained as possible as it can be while the output signal approximates to zero. A correlation vector is correlation between a signal with time delay and an input vector as described below.

$$V_x = E[x_1(t-\tau) \cdot \phi(t)] \quad \text{[Expression 20]}$$

To retain a voice component refers that a voice signal is output as it is as a result of filtering. This can be expressed by the following mathematical expression ideally.

$$V_x = R_x \cdot w \quad \text{[Expression 21]}$$

From the above, the extended learning rule for the operation sound zone can be described by the following mathematical expression. $\epsilon_x$ is a certain positive constant.

$$0 \leftarrow \phi(t)^T \cdot w \text{ subject to } \|V_x - R_x \cdot w\|^2 < \epsilon_x$$

Figure 17:
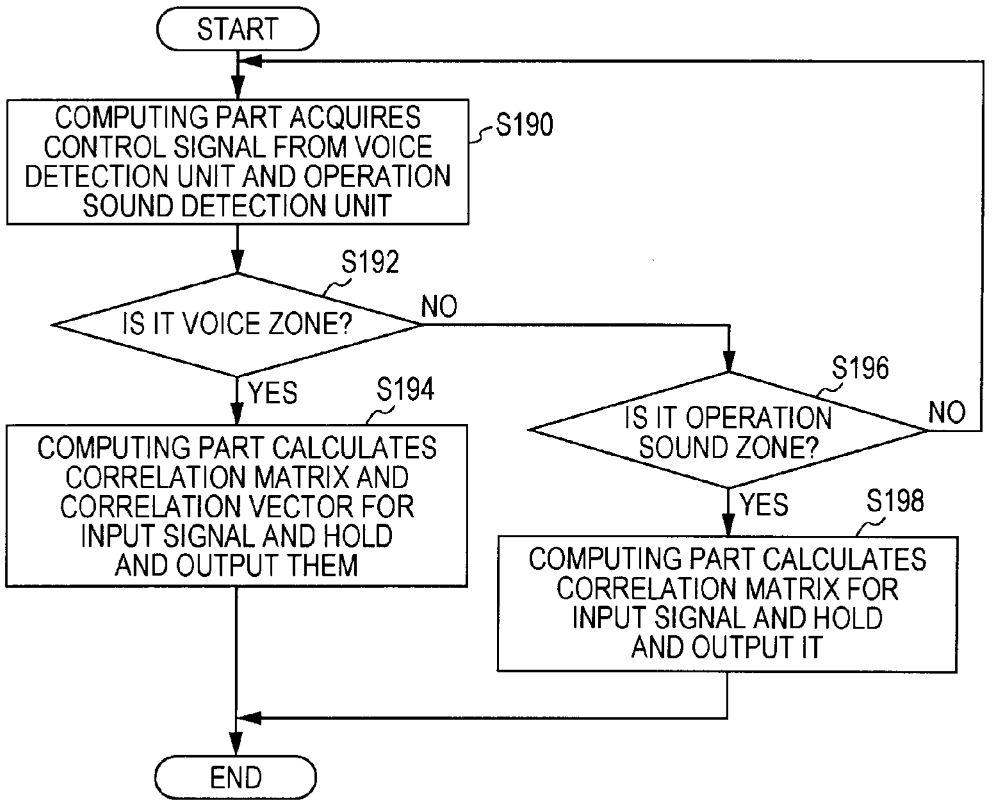
FIG. 17 is a flowchart showing a detailed operation of the feature amount calculation unit according to the embodiment.

The operation of the feature amount calculation unit 110 will be described based on the above description. FIG. 17 is a flowchart showing the operation of the feature amount calculation unit 110. As shown in FIG. 17, the computing part 130 of the feature amount calculation unit 110 acquires a control signal from the voice detection unit 102 and the operation sound detection unit 104 (S190). Then, it is determined whether or not the input signal is in the voice zone based on the control signal acquired in Step S190 (S192).

When the input signal is determined to be in the voice zone in Step S192, the computing part 130 calculates a correlation matrix and a correlation vector for the input signal and causes the holding part 132 to hold and outputs the results (S194). In addition, when the input signal is determined not to be in the voice zone in Step S192, it is determined whether or not the signal is in the operation sound zone (S196). When the input signal is determined to be in the operation sound zone in Step S196, the computing part 130 calculates a correlation matrix for the input signal, and causes the holding part 132 to hold and outputs the result (S198).

In addition, the learning rule of the filter calculation unit 106 when the feature amount calculated by the feature amount calculation unit 110 is used will be described. Hereinbelow, a case where LMS algorithm is used will be described, but the invention is not limited thereto, and the learning identification method or the like may be used.

The learning rule for the voice zone by the filter calculation unit 106 is expressed by the following mathematical expression.

$e_1 = x_1(t-\tau) - \phi(t)^T \cdot w$: Portion for holding the input signal $e_2 = 0 - w^T \cdot R_k \cdot w$: Portion for suppressing an operation sound component [Expression 22]

In the case above, for an integration filter, $e_1$ and $e_2$ are integrated by a weight $\alpha$ ($0<\alpha<1$).

$$w = w + \mu \cdot (\alpha \cdot e_1 \cdot \phi(t) + (1-\alpha) \cdot e_2 \cdot R_k \cdot w) \quad \text{[Expression 23]}$$

In addition, the learning rule for the operation sound zone is expressed by the following mathematical expression.

$e_1 = 0 - \phi(t)^T \cdot w$: Portion for suppressing an operation sound $e_2 = R_x^T \cdot (V_x - R_x \cdot w)$: Portion for holding a voice signal [Expression 24]

In the case above, for an integration filter, $e_1$ and $e_2$ are integrated by a weight $\beta$ ($0<\beta<1$).

$$w = w + \mu \cdot (\beta \cdot e_1 \cdot \phi(t) + (1-\beta) \cdot e_2) \quad \text{[Expression 25]}$$

As above, an operation sound can be suppressed also in the voice zone by putting a feature of other zone for filter updating in a certain zone. In addition, it is possible to avoid that the volume of a voice is drastically lowered particularly right after the voice is started.

In addition, in the operation sound zone, only the portion of the time delay $\tau$ may be used without using $R_x$ and $V_x$ as they are. In this case, the process can be simplified as below. In addition, $\tau$ is preferably group delay of a filter.

In other words, r_τ is a vector obtained by segmenting only τ-th row from the correlation matrix $R_x$.

In addition, v_τ is a value obtained by taking the value of τ-th from the correlation vector $V_x$.

$e_1 = 0 - \phi(t)^T \cdot w$: Portion for suppressing an operation sound $e_2 = v_\tau - r_\tau \cdot w$: Portion for holding a voice signal [Expression 26]

$$w = w + \mu \cdot (\alpha \cdot e_1 \cdot \phi(t) + (1-\alpha) \cdot e_2 \cdot r_\tau) \quad \text{[Expression 27]}$$

Hereinabove, the feature amount calculation unit 110 has been described. Returning to FIG. 2, the description on the functional composition of the voice processing device 100 will be continued. The filter unit 108 applies a filter to the voice input from the microphones by using the filter calculated by the filter calculation unit 106. Accordingly, noises can be suppressed in the voice zone while maintaining the quality of the sound, and the noise suppression can be realized such that signals smoothly continue to the voice zone in the operation sound zone.

The voice processing device 100 or 200 according to the embodiment can be applied to a head set with a boom microphone, a head set of a mobile phone or a Bluetooth, and a head set used in call centers or web-based conference which are provided with a microphone in the ear portion in addition to the mouth portion, IC recorders, video conference systems, web-based conference using microphones included in the main body of notebook PCs, or online network games played by a number of people with voice chatting.

According to the present embodiment, comfortable voice transmission is possible without being bothered by noises in surroundings and operation sounds occurring in a device. In addition, the output of voices with suppressed noises can be attained with little discontinuity in shifting zones between the voice zone and the noise zone and without a discomfort. Furthermore, operation sounds can be reduced efficiently by performing an optimum process for each zone. Moreover, the reception side can listen only to the voice of the conversation counterpart with reduced noises such as operation sounds and the like. Now, the description on the first embodiment ends.

3. Second Embodiment

Next, a second embodiment will be described. In the first embodiment, detection is to be performed for the voice zone and the non-steady sound zone (operation sound zone) with the assumption that both of a voice and an operation sound exist, but in the present embodiment, the description will be provided for a case where a background noise exists in addition to the voice and the operation sound. In the embodiment, an input signal is detected in the voice zone where a voice exists, the non-steady sound zone where non-steady noise such as an operation sound or the like exists, and a steady sound zone where steady background noise occurring form air-conditioner or the like exists, and a filter appropriate for each zone is calculated. Hereinbelow, description for the same configuration as in the first embodiment will not be repeated, and different configuration from the first embodiment will be particularly described in detail.

Figure 18:
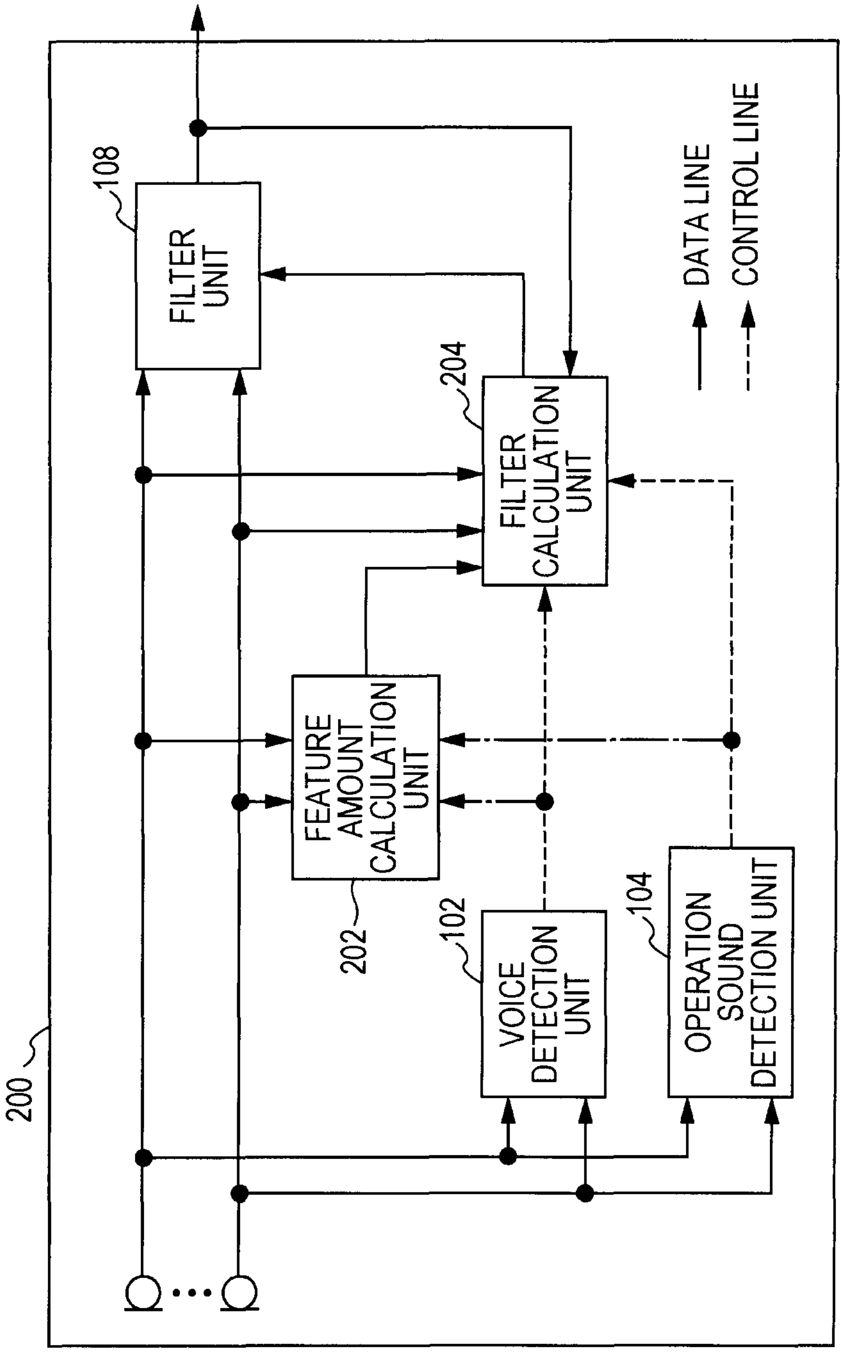
FIG. 18 is a block diagram showing the functional composition of a voice processing device according to a second embodiment of the invention.
Figure 19:
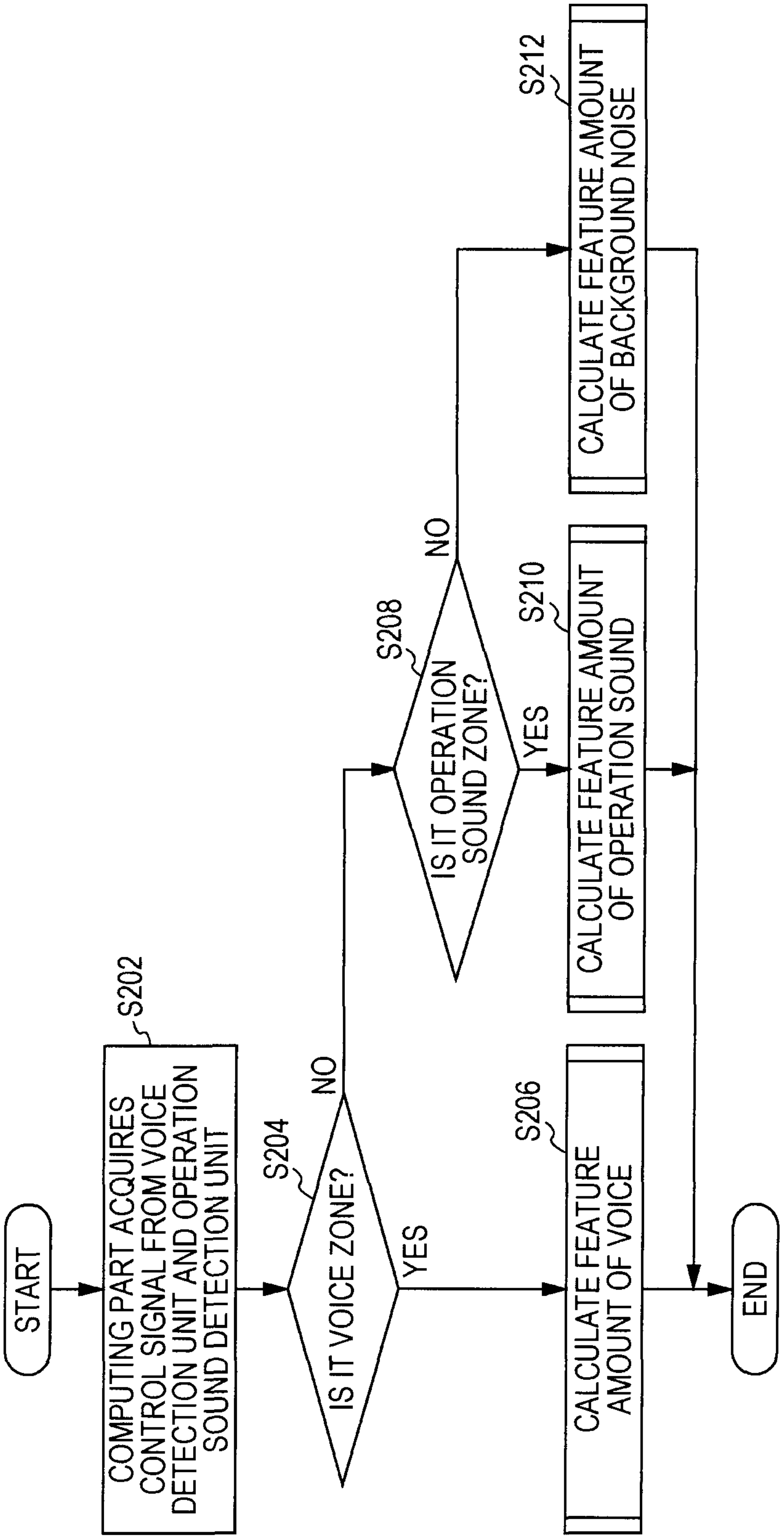
FIG. 19 is a flowchart showing a feature amount calculation process according to the embodiment.

FIG. 18 is a block diagram showing the functional composition of the voice processing device 200. As shown in FIG. 18, the voice processing device 200 is provided with the voice detection unit 102, the operation sound detection unit 104, the filter unit 108, a feature amount calculation unit 202, a filter calculation unit 204, and the like. With reference to FIG. 19, a feature amount calculation process of the feature amount calculation unit 202 will be described.

FIG. 19 is a flowchart showing a feature amount calculation process by the feature amount calculation unit 202. As shown in FIG. 19, a computing part (not shown) of the feature amount calculation unit 202 acquires a control signal from the voice detection unit 102 and the operation sound detection unit 104 (S202). Then, it is determined whether or not the input signal is in the voice zone based on the control signal acquired in Step S202 (S204). When the signal is determined to be in the voice zone in Step S204, the feature amount of the voice is calculated (S206).

When the signal is determined not to be in the voice zone in Step S204, it is determined whether or not the signal is in the operation sound zone (S208). When the signal is determined to be in the operation sound zone in Step S208, the feature amount of the operation sound is calculated (S210). In addition, when the signal is determined not to be in the operation sound zone in Step S208, the feature amount of the background noise is calculated (S212).

Figure 20:
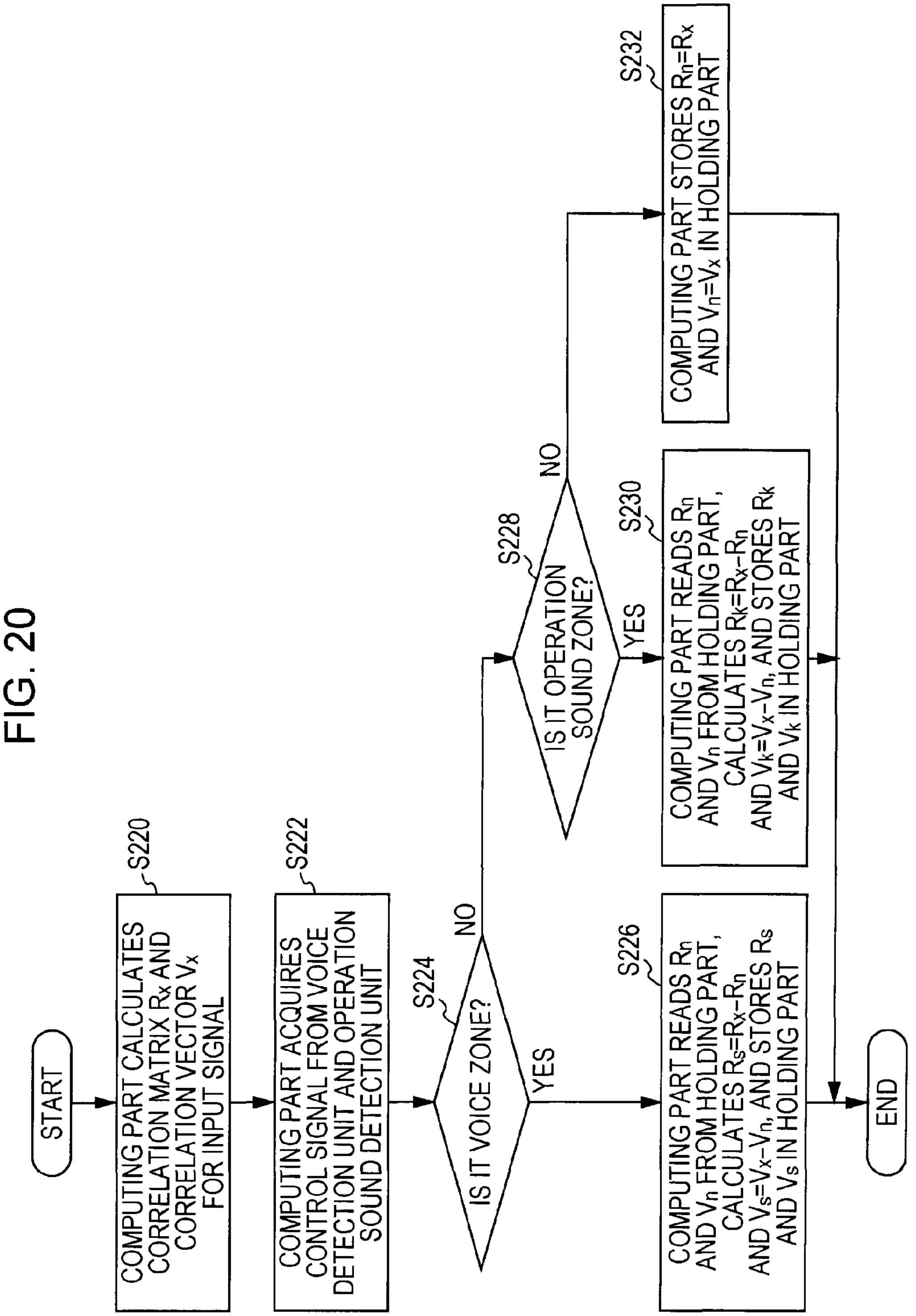
FIG. 20 is a flowchart showing a feature amount calculation process according to the embodiment.

In addition, in a case where a holding part of the feature amount calculation unit 202 has a correlation matrix $R_s$ and a correlation vector $V_s$ as the feature of the voice, has a correlation matrix $R_k$ and a correlation vector $V_k$ as the feature of the operation sound, and has a correlation matrix $R_n$ and a correlation vector $V_n$ as the feature of the background noise, the process shown in FIG. 20 is performed.

As shown in FIG. 20, first, the computing part calculates a correlation matrix $R_x$ and a correlation vector $V_x$ for an input signal (S220). Then, the computing part acquires a control signal from the voice detection unit 102 and the operation sound detection unit 104 (S222). Then, it is determined whether or not the input signal is in the voice zone based on the control signal acquired in Step S222 (S224).

When the signal is determined to be in the voice zone in Step S224, $R_n$ and $V_n$ are read from the holding part, $R_s=R_x-R_n$ and $V_s=V_x-V_n$ are calculated, and the results are held in the holding part (S226). The portion of the background noise is subtracted in Step S226. In addition, before $R_s$ and $V_s$ are held, the results may be suitably smoothed with the values that have been already held.

In addition, when the signal is determined not to be in the voice zone in Step S224, it is determined whether or not the signal is in the operation sound zone (S228). When the signal is determined to be in the operation sound zone in Step S228, $R_n$ and $V_n$ are read from the holding part, $R_k=R_x-R_n$ and $V_k=V_x-V_n$ are calculated, and the results are held in the holding part (S230). The portion of the background noise is subtracted in Step S230, but subtraction may not be conducted as the operation sound is very small.

In addition, when the signal is determined not to be in the operation sound zone in Step S228, it is set to $R_n=R_x$ and $V_n=V_x$, and the results are held in the holding part (S232).

Figure 21:
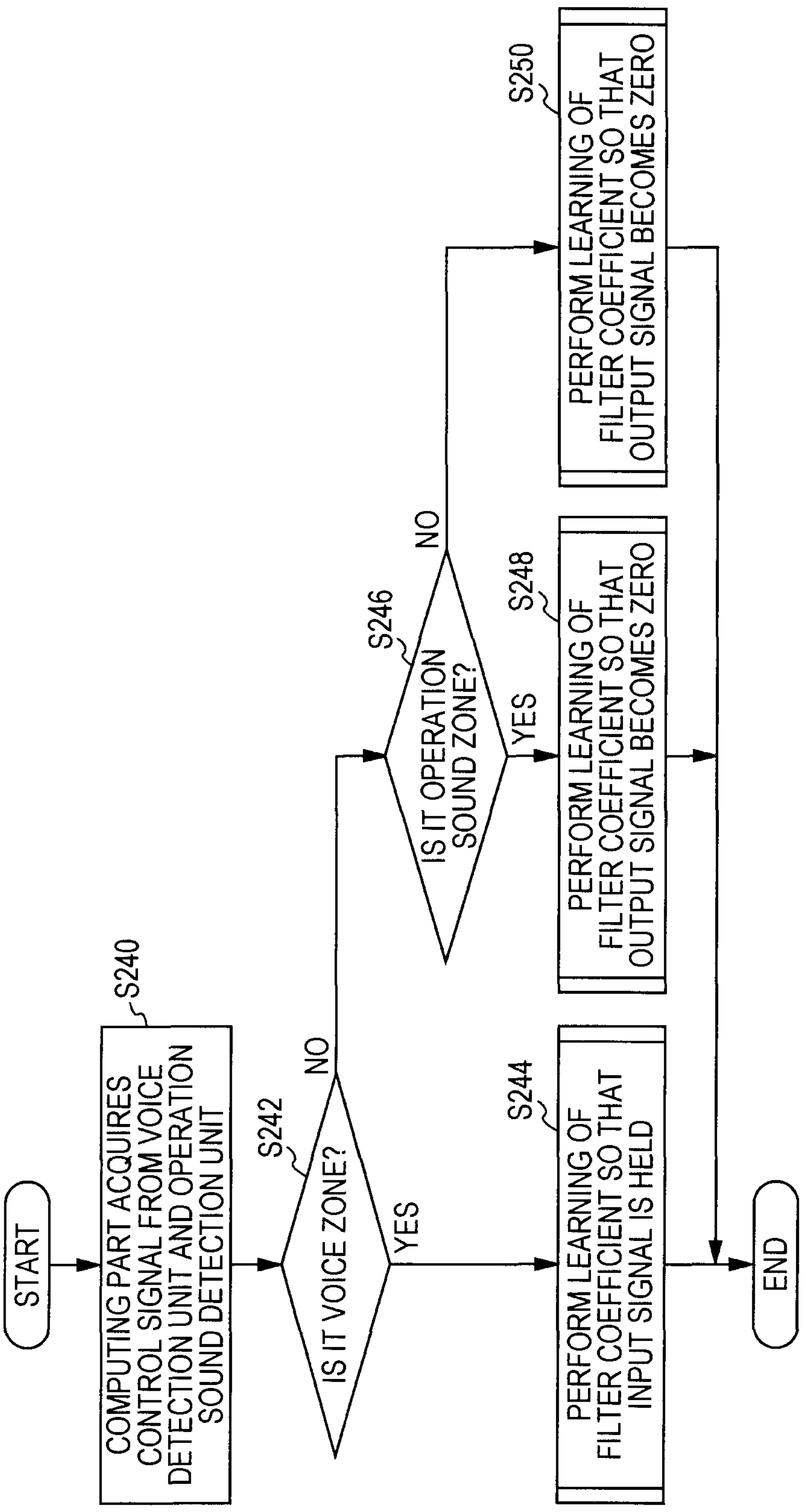
FIG. 21 is a flowchart showing a filter calculation process according to the embodiment.

Next, with reference to FIG. 21, a filter calculation process by the filter calculation unit 204 will be described. FIG. 21 is a flowchart showing a filter calculation process by the filter calculation unit 204. As shown in FIG. 21, first, the computing part (not shown) of the filter calculation unit 204 acquires a control signal from the voice detection unit 102 and the operation sound detection unit 104 (S240). Then, it is determined whether or not the input signal is in the voice zone based on the control signal acquired in Step S240 (S242).

When the signal is determined to be in the voice zone in Step S242, learning of a filter coefficient is performed so that the input signal is held (S244). When the signal is determined not to be in the voice zone in Step S242, it is determined whether or not the signal is in the operation sound zone (S246). When the signal is determined to be in the operation sound zone in Step S246, learning of a filter coefficient is performed so that an output signal is zero (S248). When the signal is determined not to be in the operation sound zone in Step S246, learning of a filter coefficient is performed so that an output signal is zero (S250).

Next, the learning rule of the filter calculation unit 204 when the feature amount calculated by the feature amount calculation unit 202 is used will be described. Hereinbelow, description will be provided for a case where LMS algorithm is used in the same manner as in the first embodiment, but the invention is not limited thereto, and the learning identification method or the like may be used.

The rule of leaning for the voice zone by the filter calculation unit 204 is expressed by the following mathematical expression. Herein, c is a value in $0 \leqq c \leqq 1$, and a value for deciding a proportion of the suppression of the operation sound and the background noise. In other words, an operation sound component can be intensively suppressed by decreasing the value of c.

$e_1=x_1(t-\tau)-\phi(t)^T\cdot w$: Portion for holding an input signal $e_2=0-w^T\cdot(c\cdot R_n+(1-c)\cdot R_k)\cdot w$: Portion for suppressing operation sound and background noise components $$w=w+\mu\cdot(\alpha\cdot e_1\cdot\phi(t)+(1-\alpha)\cdot e_2\cdot(c\cdot R_n+(1-c)\cdot R_k)\cdot w) \quad \text{[Expression 28]}$$

In addition, the learning rule for the operation sound zone is expressed by the following mathematical expression.

$e_1=0-\phi(t)^T\cdot w$: Portion for suppressing an operation sound $e_2=R_x^T\cdot(V_x-R_x\cdot w)$: Portion for holding a voice component $$w=w+\mu\cdot(\beta\cdot e_1\phi(t)+(1-\beta)\cdot e_2) \quad \text{[Expression 29]}$$

In order to satisfy a condition that an operation sound is intensively suppressed in the operation sound zone and a background noise zone is linked to the voice zone without a discomfort, it is desirable that $\beta$ ($0 \leqq \beta \leqq 1$) is set to a large value and $\gamma$ ($0 \leqq \gamma \leqq 1$) is set to a value smaller than $\beta$.

In addition, the learning rule for the background noise zone is expressed by the following mathematical expression.

$e_1=0-\phi(t)^T\cdot w$: Portion for suppressing a background noise $e_2=R_x^T\cdot(V_x-R_x\cdot w)$: Portion for holding a voice component $$w=w+\mu\cdot(\gamma\cdot e_1\phi(t)+(1-\gamma)\cdot e_2) \quad \text{[Expression 30]}$$

As such, the quality of a voice can be improved in an environment where background noises exist by slightly suppressing the noises in the voice zone in the voice processing device 200 according to the embodiment. In addition, the noises can be suppressed so that an operation sound is intensively suppressed in the operation sound zone and the background noise zone is smoothly linked to the voice zone. Now, the description on the second embodiment ends.

4. Third Embodiment

Figure 22:
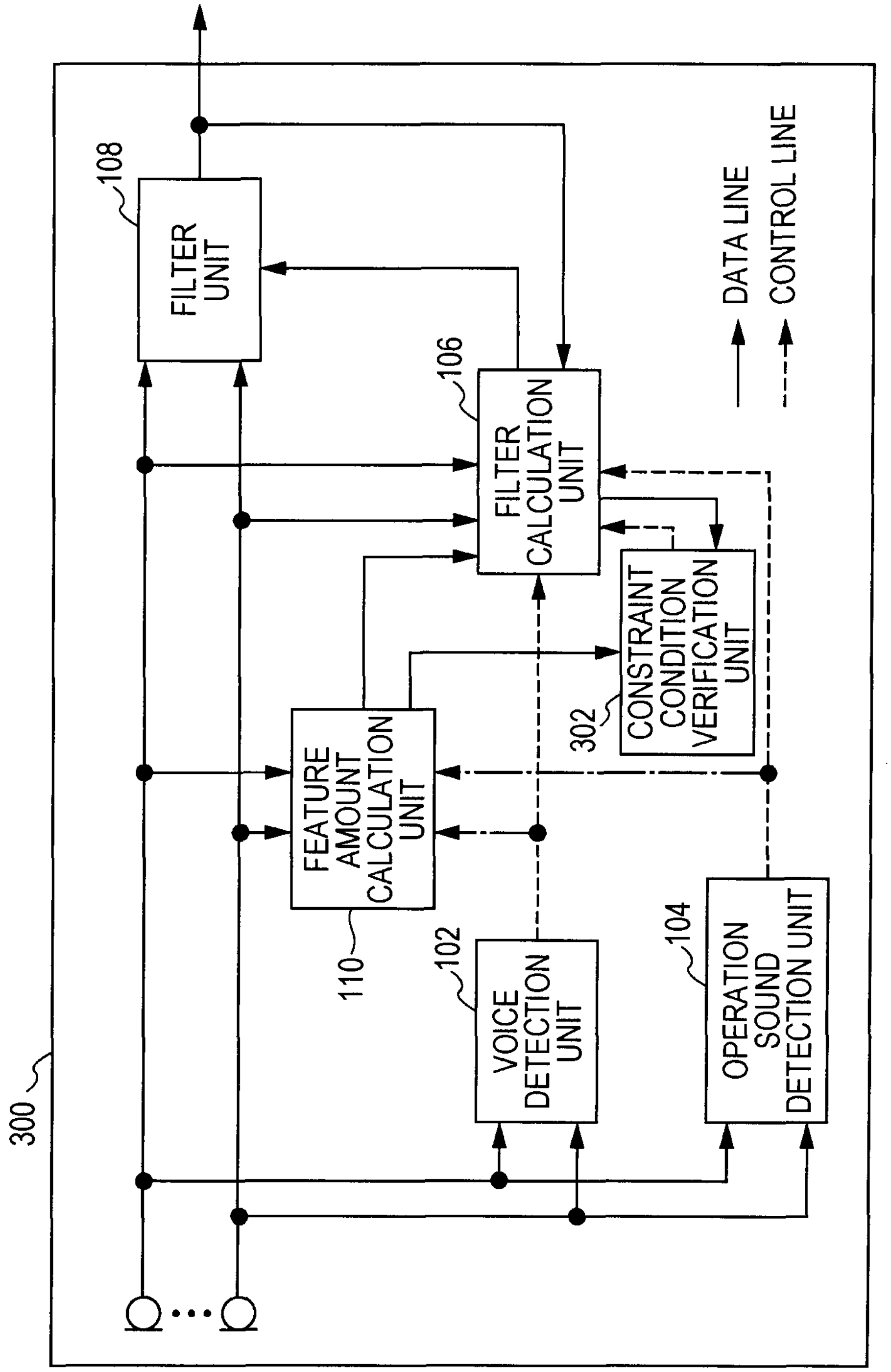
FIG. 22 is a block diagram showing the functional composition of a voice processing device according to a third embodiment of the invention.

Next, a third embodiment will be described with reference to FIG. 22. As shown in FIG. 22, the third embodiment has a difference from the first embodiment in that there is provided a constraint condition verification unit 302. Hereinbelow, description will be provided in detail particularly for the different configuration from the first embodiment.

The constraint condition verification unit 302 is an example of a verification unit of the present invention. The constraint condition verification unit 302 has a function of verifying a constraint condition of a filter coefficient calculated by the filter calculation unit 106. To be more specific, the constraint condition verification unit 302 verifies a constraint condition of a filter coefficient based on a feature amount in each zone calculated by the feature amount calculation unit 110. The constraint condition verification unit 302 places constraint on a filter coefficient both in the background noise zone and the voice zone so that the remaining noise amount is uniform. Accordingly, a sudden noise can be prevented from increasing when shifting is performed between the background noise zone and the voice zone, thereby outputting a voice without a discomfort.

Figure 23:
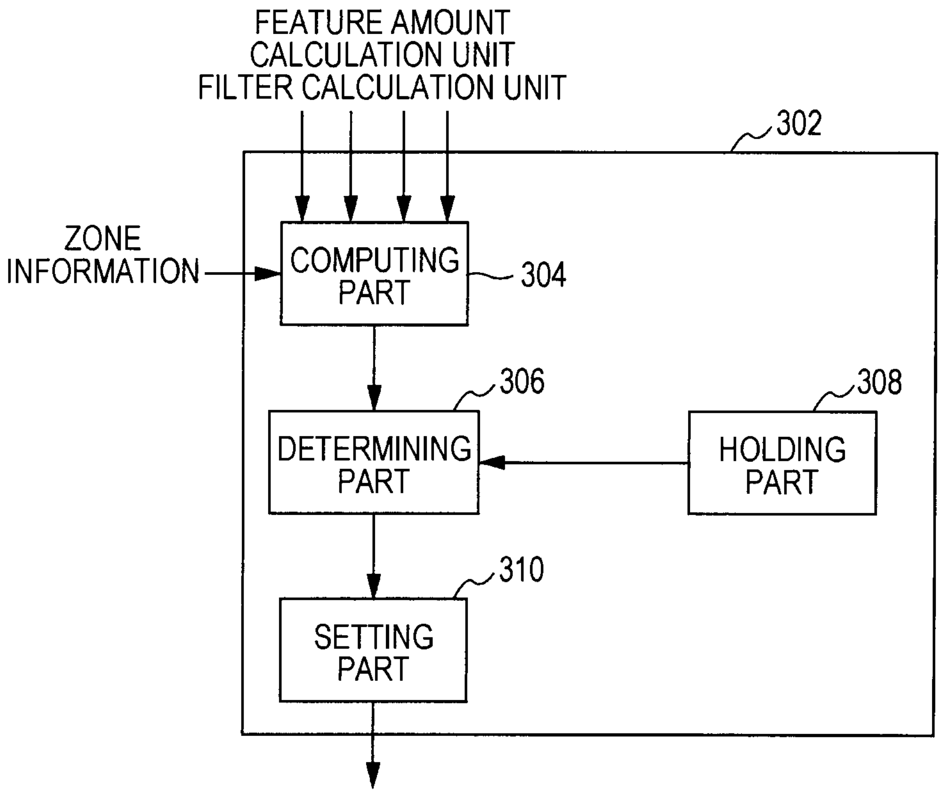
FIG. 23 is a block diagram showing the function of a constraint condition verification unit according to the embodiment.

Next, the function of the constraint condition verification unit 302 will be described with reference to FIG. 23. FIG. 23 is a block diagram showing the function of a constraint condition verification unit 302. As shown in FIG. 23, a computing part 304 calculates a predetermined evaluation value by using a feature amount supplied from the feature amount calculation unit 110 and the current filter coefficient of the filter calculation unit 106. Then, a determining part 306 performs determination by comparing a value held in a holding part 308 and the evaluation value calculated by the computing part 304. A setting part 310 sets a filter coefficient of the filter calculation unit 106 according to the determination result by the determining part 306.

Figure 24:
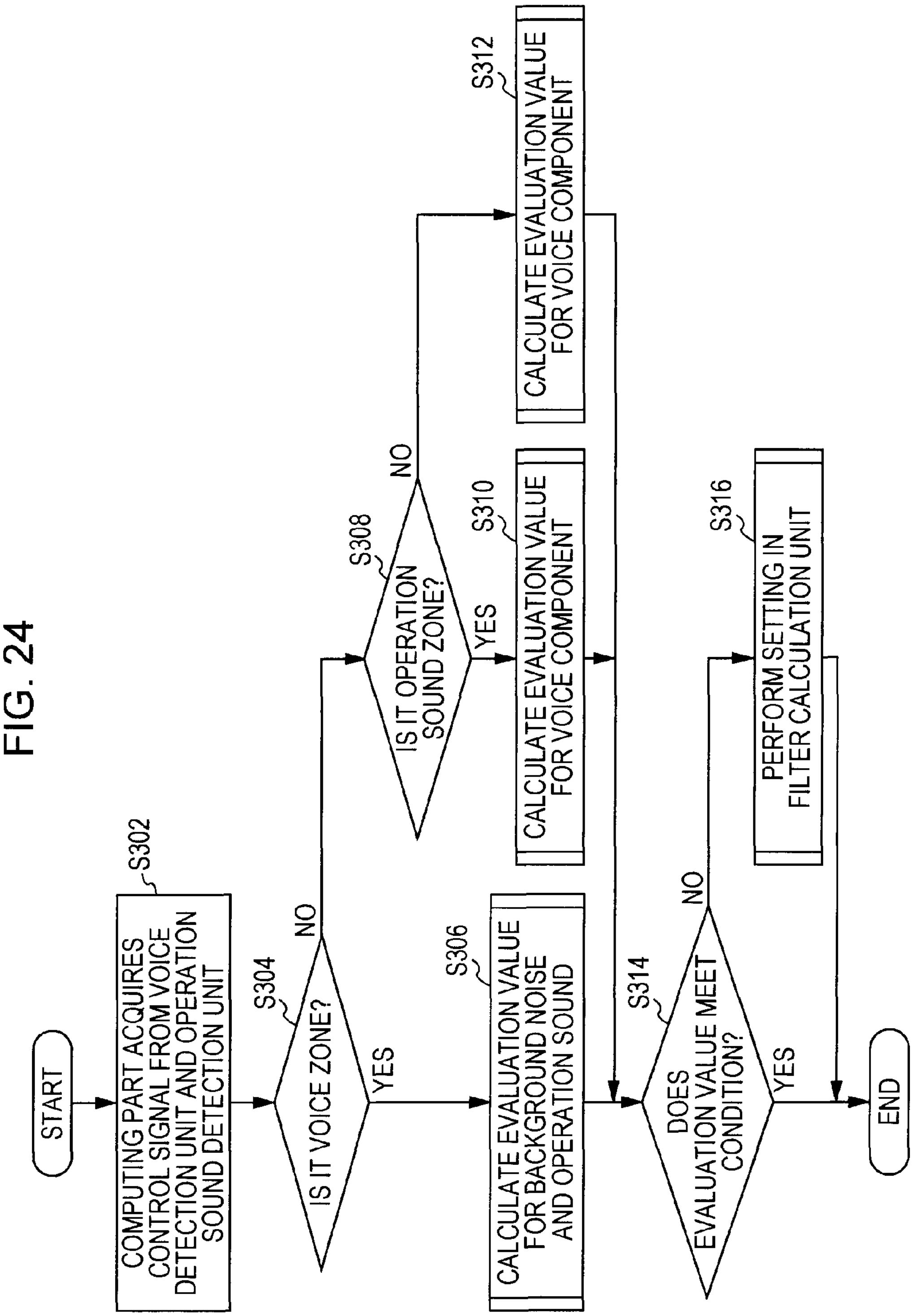
FIG. 24 is a flowchart showing a constraint condition verification process according to the embodiment.

Next, a constraint condition verification process by the constraint condition verification unit 302 will be described with reference to FIG. 24. FIG. 24 is a flowchart showing a constraint condition verification process by the constraint condition verification unit 302. As shown in FIG. 24, first, the computing part 304 acquires a control signal from the voice detection unit 102 and the operation sound detection unit 104 (S302). Then, it is determined whether or not the input signal is in the voice zone based on the control signal acquired in Step S302 (S304).

When the signal is determined to be in the voice zone in Step S304, an evaluation value for a background noise and an operation sound is calculated (S306). In addition, when the signal is determined not to be in the voice zone in Step S304, it is determined whether or not the signal is in the operation sound zone (S308). When the signal is determined to be in the operation sound zone in Step S308, an evaluation value for a voice component is calculated (S310). In addition, when the signal is determined not to be in the operation sound zone in Step S308, an evaluation value for a voice component is calculated (S312).

Then, it is determined whether or not the evaluation values calculated in Steps S306, S310, and S312 satisfy a predetermined condition (S314). When the values are determined to satisfy the condition in Step S314, the process ends. When the values are determined not to satisfy the condition in Step S314, a filter coefficient is set in the filter calculation unit 106 (S316).

Hereinbelow, a case where the constraint condition verification unit 302 uses a correlation matrix and a correlation vector obtained from the feature amount calculation unit 110 will be described. The constraint condition verification unit 302 defines the deterioration amount of a voice component, the suppression amount of a background noise component, and the suppression amount of an operation sound component based on each feature amount with the following mathematical expression respectively.

$P_1=\|V_x-R_x\cdot w\|^2$: Deterioration amount of a voice component $P_2=w^T\cdot R_n\cdot w$: Suppression amount of a background noise component $P_3=w^T\cdot R_k\cdot w$: Suppression amount of an operation sound component [Expression 31]

Then, it is determined whether or not the values of $P_2$ and $P_3$ are greater than a threshold value in the voice zone. In addition, it is determine whether or not the value of $P_1$ is greater than the threshold value in the background noise zone. Furthermore, it is determined whether or not the value of $P_1$ is greater than the threshold value in the operation sound zone.

Description will be provided on how the filter coefficient of the filter calculation unit 106 is to be controlled according to the above-described verification result by the constraint condition verification unit 302. The control of a filter coefficient in the background noise zone will be exemplified. The learning rule of a filter in the background noise zone is expressed as below.

$$e_1=0-\phi(t)^T\cdot w$$

$$e_2=R_x^T\cdot(V_x-R_x\cdot w)$$

$$w=w+\mu\cdot(\gamma\cdot e_1\cdot\phi(t)+(1-\gamma)\cdot e_2)$$ [Expression 32]

Herein, when the value of $P_1$ is determined to be greater than the threshold value in the above determination, the deterioration of the voice is significant, and therefore, controlling is performed so that the voice does not deteriorate. In other words, the value of $\gamma$ is decreased. In addition, when the value of $P_1$ is determined to be smaller than the threshold value in the above determination, the deterioration of the voice is insignificant, and therefore, controlling is performed so that a background noise is suppressed further. In other words, the value of $\gamma$ is increased. As such, controlling can be performed by having a weight coefficient of an error in the filter calculation unit 106 to be variable.

Figure 25:
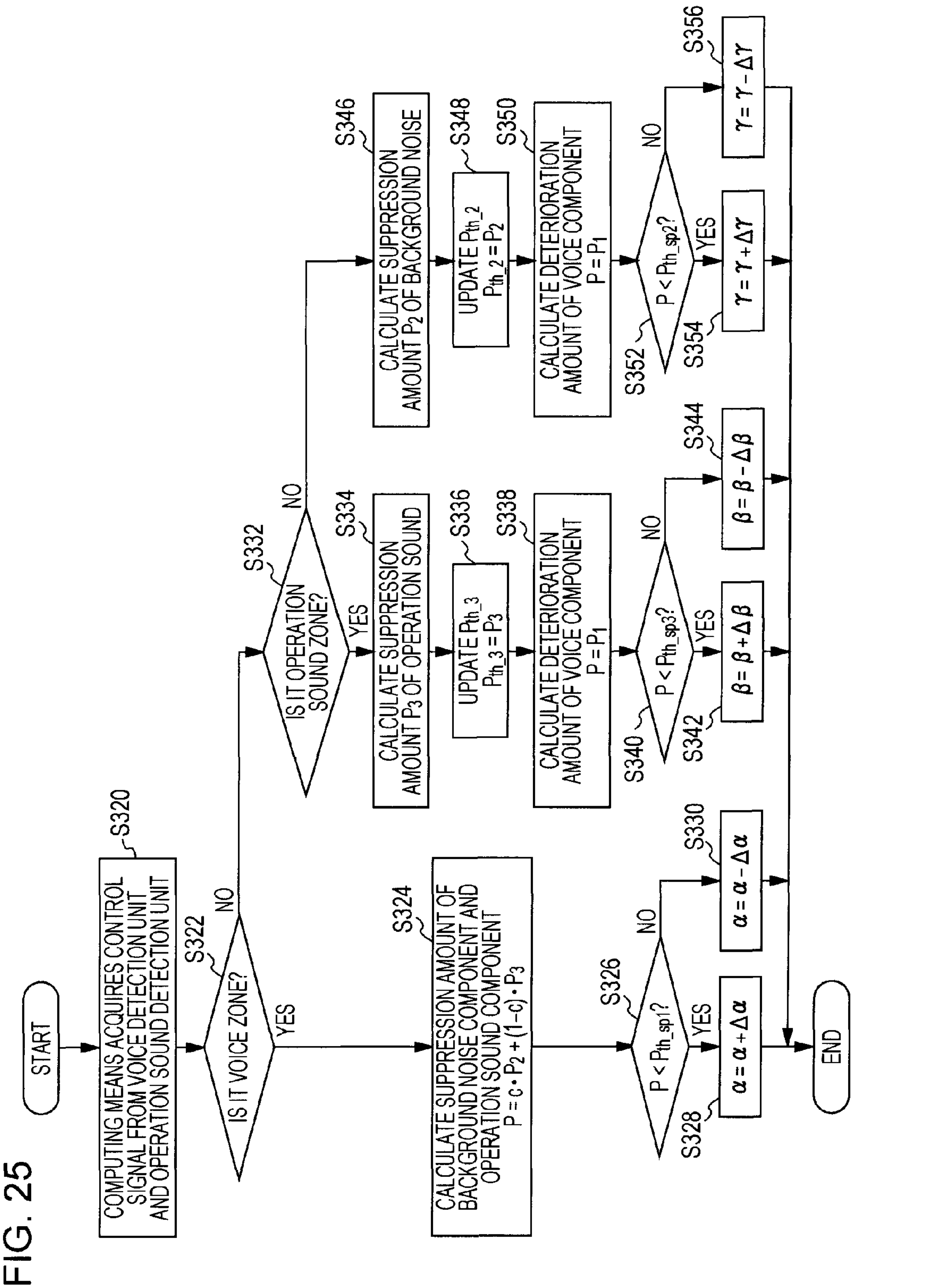
FIG. 25 is a flowchart showing the constraint condition verification process according to the embodiment.

Next, a specific process of the constraint condition verification unit 302 will be described with reference to FIG. 25. FIG. 25 is a flowchart showing the specific constraint condition verification process of the constraint condition verification unit 302. As shown in FIG. 25, first, the computing part 304 acquires a control signal from the voice detection unit 102 and the operation sound detection unit 104 (S320). Then, it is determined whether or not the input signal is in the voice zone based on the control signal acquired in Step S320 (S322). When the signal is determined to be in the voice zone in Step S322, the suppression amounts of a background noise component and an operation sound component are calculated with the following mathematical expression (S324).

$$P=c\cdot P_2+(1-c)\cdot P_3 \quad \text{[Expression 33]}$$

Then, it is determined whether or not the suppression amount P calculated in Step S324 is smaller than the threshold value $P_{th\_sp1}$ (S326). Here, the threshold value $P_{th\_sp1}$ of the suppression amount of a noise is calculated by the following mathematical expression.

$$P_{th\_1}=c\cdot P_{th\_2}+(1-c)\cdot P_{th\_3} \quad \text{[Expression 34]}$$

When the suppression amount P is determined to be smaller than the threshold value $P_{th\_sp1}$ in Step S326, the value of the filter coefficient α is increased (α=α+Δα) (S328). In addition, when the suppression amount P is determined to be greater than the threshold value $P_{th\_sp1}$, the value of the filter coefficient α is decreased (α=α−Δα) (S330).

When the signal is determined not to be in the voice zone in Step S322, it is determined whether or not the signal is in the operation sound zone (S332). When the signal is determined to be in the operation sound zone in Step S332, the suppression amount $P_3$ of an operation sound is calculated (S334). Then, $P_{th\_3}$ is updated ($P_{th\_3}=P_3$) (S336). Then, the deterioration amount of a voice component ($P=P_1$) is calculated (S338).

Then, it is determined whether or not the deterioration amount P calculated in Step S338 is smaller than the threshold value $P_{th\_sp3}$ (S340). The threshold value $P_{th\_sp3}$ in Step S340 is given from outside in advance. When the deterioration amount P is determined to be smaller than the threshold value $P_{th\_sp3}$ in Step S340, the value of the filter coefficient β is increased (β=β+Δβ) (S342). When the deterioration amount P is determined to be greater than the threshold value $P_{th\_sp3}$ in Step S340, the value of the filter coefficient β is decreased (β=β−Δβ) (S342).

When the signal is determined not to be in the operation sound zone in Step S332, the suppression amount $P_2$ of a background noise is calculated (S346). Then, $P_{th\_2}$ is updated ($P_{th\_2}=P_2$) (S348). Then, the deterioration amount of a voice component ($P=P_1$) is calculated (S350).

Then, it is determine whether or not the deterioration amount P calculated in Step S350 is smaller than the threshold value $P_{th\_sp2}$ (S352). The threshold value $P_{th\_sp2}$ in Step S352 is given from outside in advance. When the deterioration amount P is determined to be smaller than the threshold value $P_{th\_sp2}$ in Step S352, the value of the filter coefficient γ is increased (γ=γ+Δγ) (S354). When the deterioration amount P is determined to be greater than the threshold value $P_{th\_sp2}$ in Step S352, the value of the filter coefficient γ is decreased (γ=γ−Δγ) (S356).

Now, the description on the third embodiment ends. According to the third embodiment, it is possible to finally output a voice without a discomfort in addition to the suppression of a noise.

5. Fourth Embodiment

Figure 26:
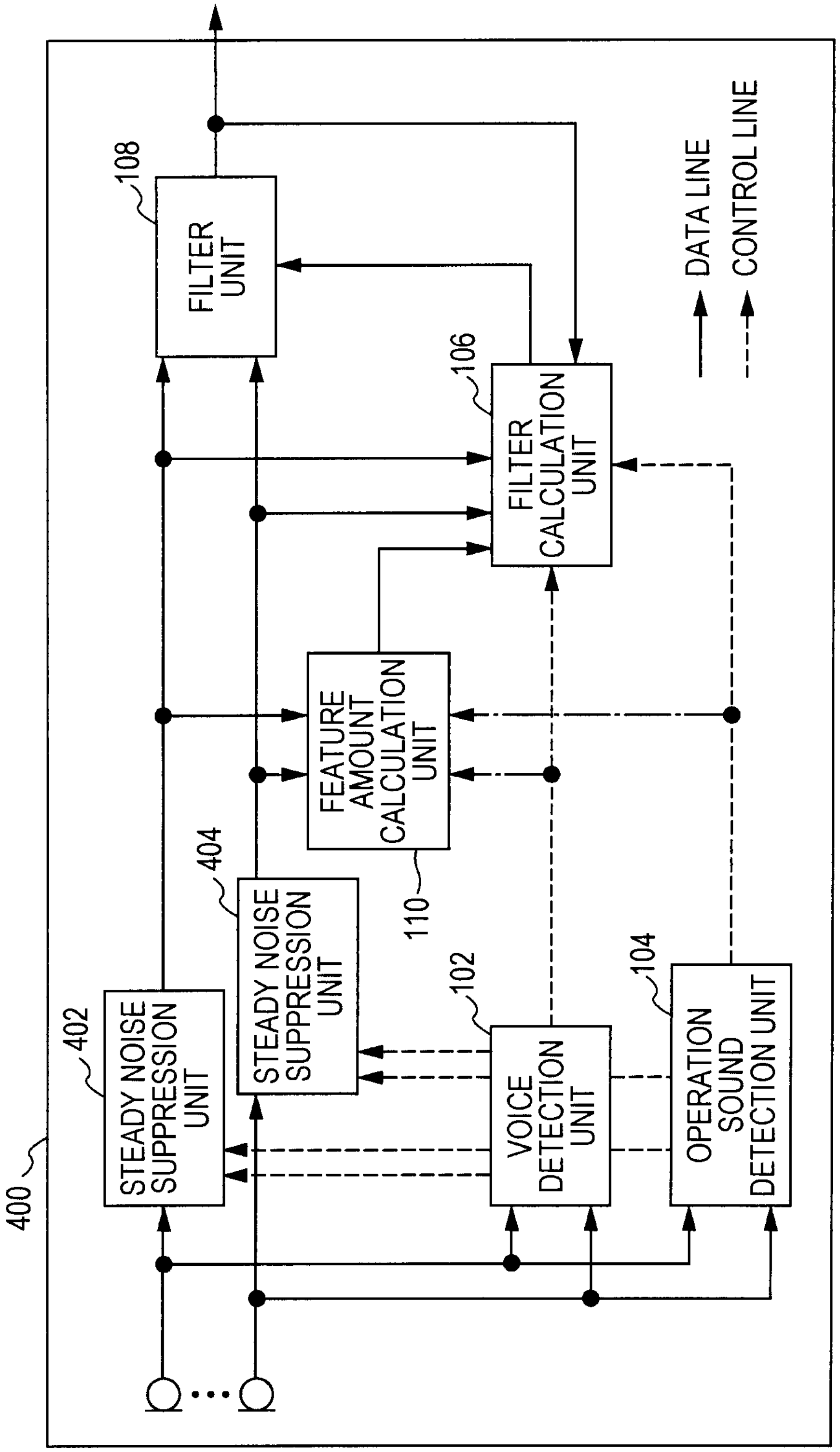
FIG. 26 is a block diagram showing the functional composition of a voice processing device according to a fourth embodiment of the invention.

Next, a fourth embodiment will be described. FIG. 26 is a block diagram showing the functional composition of a voice processing device 400 according to the embodiment. The embodiment has a difference from the first embodiment in that there are provided steady noise suppression units 402 and 404. Hereinbelow, description will be provided in detail particularly for the different configuration from the first embodiment. The steady noise suppression units 402 and 404 suppress a background noise in advance before suppressing an operation sound. Accordingly, it is possible to efficiently suppress the operation sound in the latter stage of a process. Any method of the spectral subtraction in a frequency domain, Wiener filter in a time domain, or the like may be used in the steady noise suppression unit 402.

6. Fifth Embodiment

Figure 27:
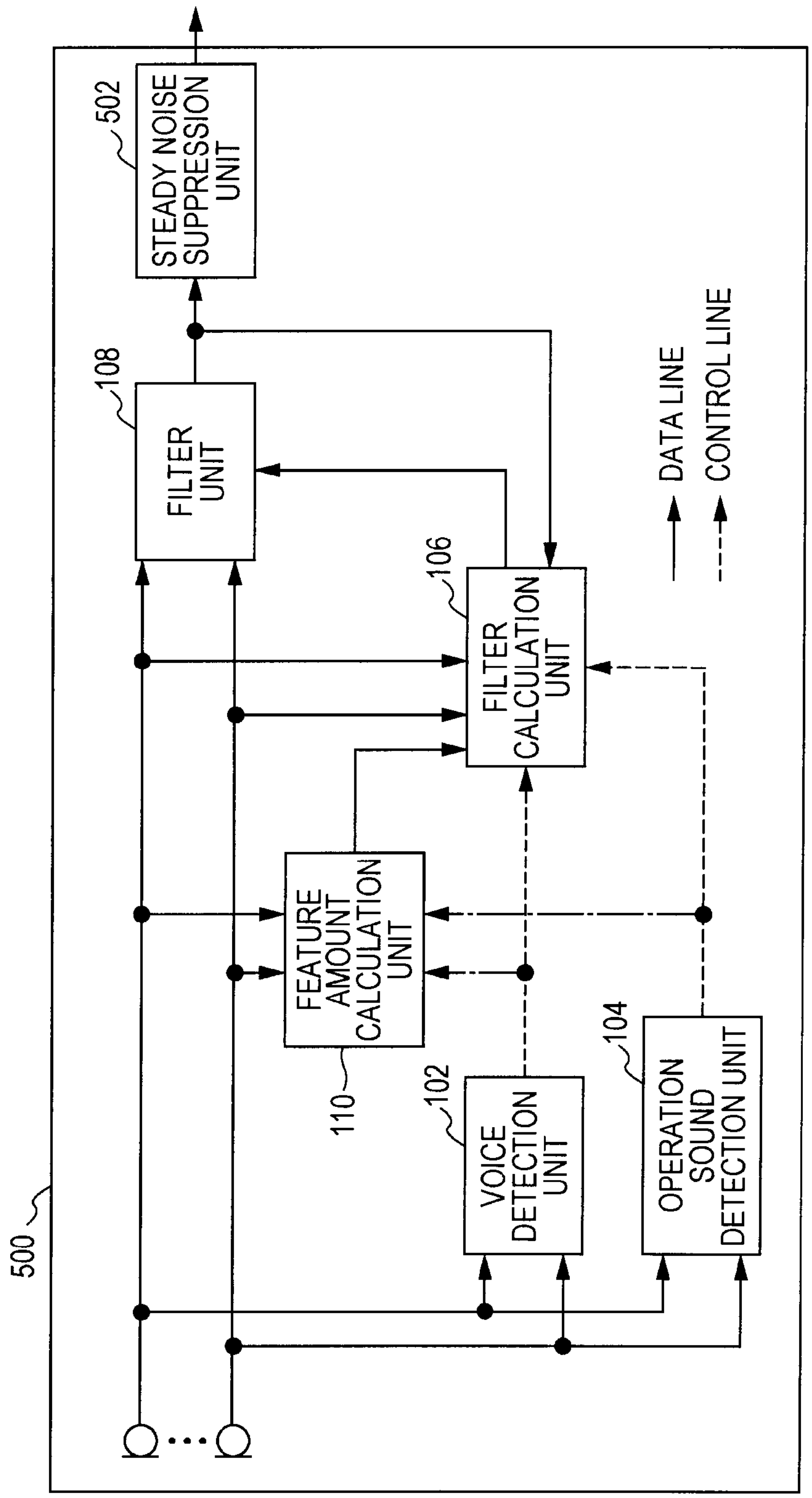
FIG. 27 is a block diagram showing the functional composition of a voice processing device according to a fifth embodiment of the invention.

Next, a fifth embodiment will be described. FIG. 27 is a block diagram showing the functional composition of a voice processing device 500 according to the embodiment. The embodiment has a difference from the first embodiment in that there is provided a steady noise suppression unit 502. Hereinbelow, description will be provided in detail particularly for the different configuration from the first embodiment. The steady noise suppression unit 502 is provided next to the filter unit 108, and can reduce remaining noises that remain after the suppression of an operation sound and a background noise.

7. Sixth Embodiment

Figure 28:
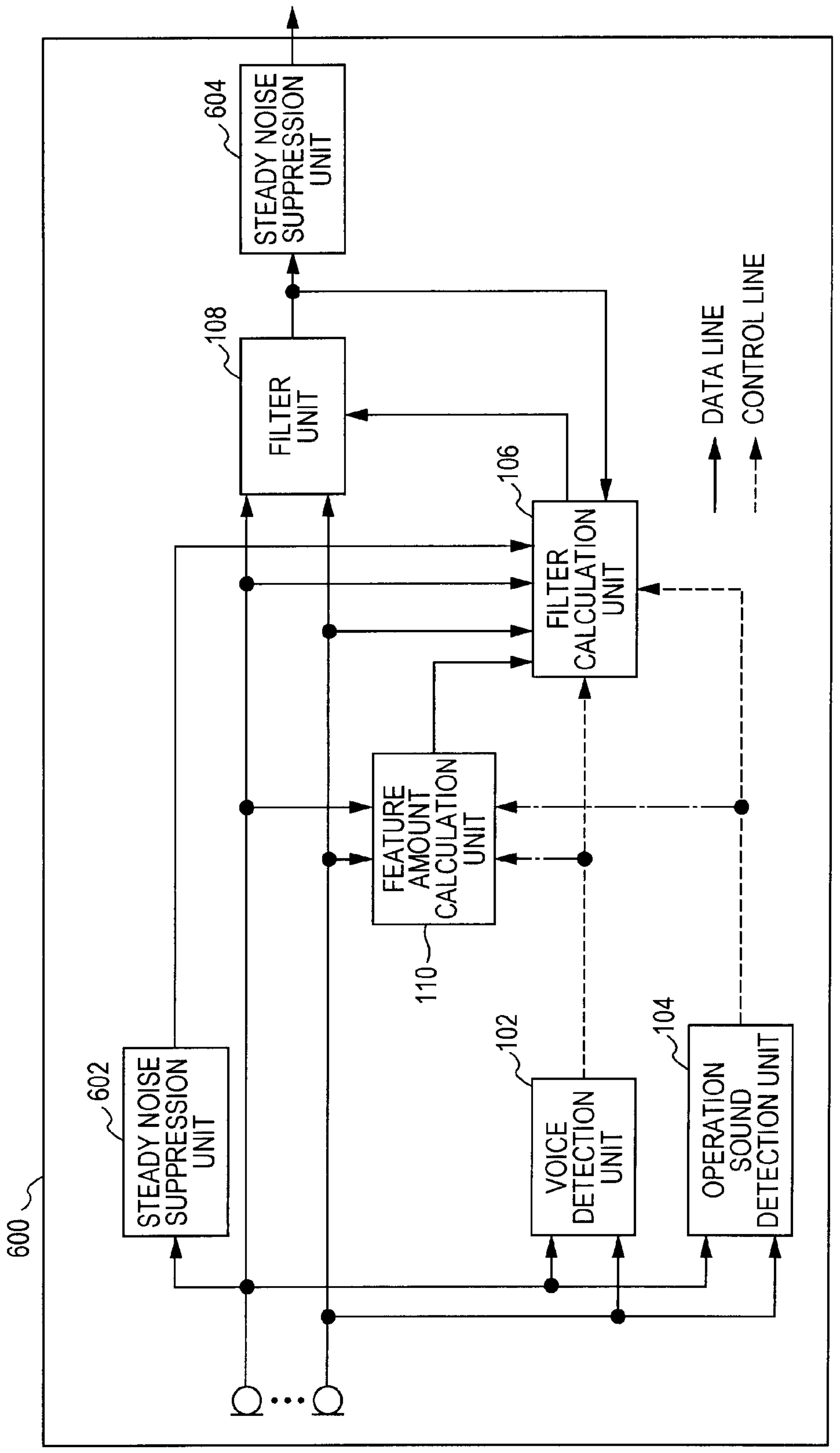
FIG. 28 is a block diagram showing the functional composition of a voice processing device according to a sixth embodiment of the invention.

Next, a sixth embodiment will be described. FIG. 28 is a block diagram showing the functional composition of a voice processing device 600 according to the embodiment. The embodiment has a difference from the first embodiment in that there are provided steady noise suppression units 602 and 604. Hereinbelow, description will be provided in detail particularly for the different configuration from the first embodiment. The steady noise suppression unit 602 is provided for a certain channel. In addition, the output of the steady noise suppression unit 602 is used for the calculation of a filter in the voice zone.

The learning rule of a filter in the voice zone is expressed by the following mathematical expression.

$$e_1=x_1(t-\tau)-\phi(t)^T\cdot w$$

$$e_2=0-w^T\cdot(c\cdot R_n+(1-c)\cdot R_k)\cdot w$$

$$w=w+\mu\cdot(\alpha\cdot e_1\phi(t)+(1-\alpha)\cdot e_2\cdot(c\cdot R_n+(1-c)\cdot R_k)\cdot w) \quad \text{[Expression 35]}$$

Until now, the input signal including a background noise has been used, but in the present embodiment, the output of the steady noise suppression unit 602 is used in stead of the following value.

$$x_1(t-\tau) \quad \text{[Expression 36]}$$

As such, the effect of suppressing a steady noise in the filter unit 108 can be enhanced by simply using the signal that suppresses the steady noise.

Hereinabove, exemplary embodiments of the present invention are described in detail with reference to accompanying drawings, but the invention is not limited thereto. It is obvious that a person who has general knowledge in the technical field to which the invention belongs can understand various modified or altered examples within the range of the technical idea described in the claims of the invention, and it is naturally understood that they belong to the technical range of the present invention.

For example, it is not necessary that each step in the processes of the voice processing devices 100, 200, 300, 400, 500, and 600 of the present specification is to be processed in a time series according to the order described in flowcharts. In other words, each step in the processes of the voice processing devices 100, 200, 300, 400, 500, and 600 may be implemented in parallel even in different processes.

In addition, the voice processing devices 100, 200, 300, 400, 500, and 600 can be created in the form of a computer program for exhibiting the same function as that of each configuration of hardware such as CPU, ROM, RAM, and the like embedded in the above-described voice processing devices 100, 200, 300, 400, 500, and 600. Furthermore, a memory medium for storing the computer program also can be provided.

The present application contains subject matter related to that disclosed in Japanese Priority Patent Application JP 2010-059622 filed in the Japan Patent Office on Mar. 16, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A voice processing device comprising:

a zone detection unit which detects a voice zone including a voice signal or a non-steady sound zone including a non-steady signal other than the voice signal from an input signal, wherein the zone detection unit detects a steady sound zone that includes the voice signal or steady signal other than the non-steady signal;

a filter calculation unit that calculates a filter coefficient of a filter for maintaining the voice signal in the voice zone and for suppressing the non-steady signal in the non-steady sound zone according to the detection result by the zone detection unit, wherein the filter calculation unit calculates a filter coefficient for suppressing the steady sound signal in the steady sound zone, wherein the filter calculation unit calculates the filter coefficient by using a filter coefficient calculated in the non-steady sound zone for the voice zone and using a filter coefficient calculated based on the contents of the voice zone for the non-steady sound zone; and a verification unit which verifies a constraint condition of the filter coefficient calculated by the filter calculation unit, wherein the verification unit verifies a constraint condition of the filter coefficient in the voice zone based on the determination of whether or not the amount of suppression of the non-steady sound signal in the non-steady sound zone and the amount of suppression of the steady sound signal in the steady sound zone, that would result from applying the filter to the input signal, is equal to or smaller than a predetermined threshold value.

2. The voice processing device according to claim 1, further comprising:

a recording unit which records information of the filter coefficient calculated in the filter calculation unit in a storing unit for each zone, wherein the filter calculation unit calculates the filter coefficient by using information of the filter coefficient of the non-steady sound zone recorded in the voice zone and information of the filter coefficient of the voice zone recorded in the non-steady sound zone.

3. The processing device according to claim 1, wherein the filter calculation unit calculates a filter coefficient for outputting a signal that makes the input signal be held in the voice zone and calculates a filter coefficient for outputting a signal that makes the input signal zero in the non-steady sound zone.

4. The voice processing device according to claim 1, further comprising:

a feature amount calculation unit which calculates the feature amount of the voice signal in the voice zone and the feature amount of the non-steady sound signal in the non-steady sound zone, wherein the filter calculation unit calculates the filter coefficient by using the feature amount of the non-steady signal in the voice zone and using the feature amount of the voice signal in the non-steady sound zone.

5. The voice processing device according to claim 1, wherein the feature amount calculation unit calculates the feature amount of the steady sound signal in the steady sound zone.

6. The voice processing device according to claim 5, wherein the filter calculation unit calculates the filter coefficient by using the feature amount of the non-steady sound signal and the feature amount of the steady sound signal in the voice zone, using the feature amount of the voice signal in the non-steady sound zone, and using the feature amount of the voice signal in the steady sound zone.

7. The voice processing device according to claim 4, wherein the verification unit verifies a constraint condition of the filter coefficient based on the feature amount in each zone calculated by the feature amount calculation unit.

8. A voice processing device comprising:

a zone detection unit which detects a voice zone including a voice signal or a non-steady sound zone including a non-steady signal other than the voice signal from an input signal, wherein the zone detection unit detects a steady sound zone that includes the voice signal or a steady signal other than the non-steady signal;

a filter calculation unit that calculates a filter coefficient of a filter for maintaining the voice signal in the voice zone and for suppressing the non-steady signal in the non-steady sound zone according to the detection result by the zone detection unit, wherein the filter calculation unit calculates a filter coefficient for suppressing the steady sound signal in the steady sound zone, wherein the filter calculation unit calculates the filter coefficient by using a filter coefficient calculated in the non-steady sound zone for the voice zone and using a filter coefficient calculated based on the contents of the voice zone for the non-steady sound zone; and a verification unit which verifies a constraint condition of the filter coefficient calculated by the filter calculation unit, wherein the verification unit verifies a constraint condition of the filter coefficient in the non-steady sound zone based on the determination whether or not a deterioration amount of the voice signal in the voice zone, that would result from applying the filter to the input signal, is equal to or greater than a predetermined threshold value.

9. A voice processing device comprising:

a zone detection unit which detects a voice zone including a voice signal or a non-steady sound zone including a non-steady signal other than the voice signal from an input signal, wherein the zone detection unit detects a steady sound zone that includes the voice signal or a steady signal other than the non-steady signal;

a filter calculation unit that calculates a filter coefficient of a filter for maintaining the voice signal in the voice zone and for suppressing the non-steady signal in the non-steady sound zone according to the detection result by the zone detection unit, wherein the filter calculation unit calculates a filter coefficient for suppressing the steady sound signal in the steady sound zone, wherein the filter calculation unit calculates the filter coefficient by using a filter coefficient calculated in the non-steady sound zone for the voice zone and using a filter coefficient calculated based on the contents of the voice zone for the non-steady sound zone; and a verification unit which verifies a constraint condition of the filter coefficient calculated by the filter calculation unit, wherein the verification unit verifies a constraint condition of the filter coefficient in the steady sound zone based on the determination whether or not a deterioration amount of the voice signal in the voice zone, that would result from applying the filter to the input signal, is equal to or greater than a predetermined threshold value.

* * * * *